United States Patent
Fu et al.

(10) Patent No.: US 11,069,090 B2
(45) Date of Patent: Jul. 20, 2021

(54) SYSTEMS AND METHODS FOR IMAGE PROCESSING

(71) Applicant: ZHEJIANG DAHUA TECHNOLOGY CO., LTD., Zhejiang (CN)

(72) Inventors: Jianhai Fu, Hangzhou (CN); Changjiu Yang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 16/718,304

(22) Filed: Dec. 18, 2019

(65) Prior Publication Data

US 2020/0126261 A1    Apr. 23, 2020

Related U.S. Application Data

(63) Continuation of application No. PCT/CN2018/086456, filed on May 11, 2018.

(30) Foreign Application Priority Data

Jul. 28, 2017   (CN) .......................... 201710631848.8
Jul. 28, 2017   (CN) .......................... 201710652831.0

(51) Int. Cl.
     *G06T 7/90*        (2017.01)
     *G06T 7/13*        (2017.01)
     *G06T 5/00*        (2006.01)

(52) U.S. Cl.
     CPC ................ *G06T 7/90* (2017.01); *G06T 5/001* (2013.01); *G06T 7/13* (2017.01); *G06T 2207/10024* (2013.01)

(58) Field of Classification Search
CPC .. G06T 7/90; G06T 7/13; G06T 5/001; G06T 2207/10024; G06T 5/002; H04N 9/64;
(Continued)

(56) References Cited

U.S. PATENT DOCUMENTS 9,191,635 B2 * 11/2015 Mlinar ..................... G06K 9/46
2003/0091232 A1    5/2003 Kalevo et al.
(Continued)

FOREIGN PATENT DOCUMENTS

CN      102156964 A     8/2011
CN      102750671 A    10/2012
(Continued)

OTHER PUBLICATIONS

International Search Report in PCT/CN2018/086456 dated Jul. 30, 2018, 4 pages.
(Continued)

*Primary Examiner* — Ali Bayat
(74) *Attorney, Agent, or Firm* — Metis IP LLC

(57) ABSTRACT

A method for identifying a color of an object may include obtaining a target image including the object and identifying in the target image a region of interest (ROI) including the object. The method may also include identifying at least one sub-region of the object from the ROI of the object and determining at least one first characteristic vector respectively corresponding to the at least one sub-region. The method may further include determining a second characteristic vector of the ROI of the object and identifying, based on the at least one first characteristic vector and the second characteristic vector, the color of the object using a color identification model. The method may further include correcting the color of the target image.

18 Claims, 11 Drawing Sheets

(58) Field of Classification Search
CPC ............. G06K 9/4652; G06K 9/00771; G06K 9/3233; G06K 9/40; G06K 9/4604
USPC ......................................................... 382/167
See application file for complete search history.

(56) References Cited

U.S. PATENT DOCUMENTS

| | | |
|---|---|---|
| 2006/0291746 A1 | 12/2006 | Kang et al. |
| 2009/0129695 A1 | 5/2009 | Aldrich et al. |
| 2009/0161019 A1 | 6/2009 | Jang |
| 2010/0141809 A1 | 6/2010 | Fukutomi et al. |
| 2013/0321675 A1* | 12/2013 | Cote .................. H04N 9/04561 348/242 |
| 2013/0322752 A1* | 12/2013 | Lim .......................... G06T 5/20 382/167 |
| 2013/0322753 A1* | 12/2013 | Lim .......................... G06T 5/50 382/167 |
| 2014/0313369 A1* | 10/2014 | Kageyama ............... H04N 9/68 348/223.1 |
| 2015/0138366 A1* | 5/2015 | Keelan ..................... H04N 9/64 348/164 |
| 2016/0117848 A1* | 4/2016 | Hattori ..................... G06K 9/38 382/103 |
| 2016/0142691 A1* | 5/2016 | Kobiki ................. H04N 9/3194 348/746 |

FOREIGN PATENT DOCUMENTS

| | | |
|---|---|---|
| CN | 106326893 A | 1/2017 |
| CN | 107451976 A | 12/2017 |
| CN | 107480676 A | 12/2017 |

OTHER PUBLICATIONS

Written Opinion in PCT/CN2018/086456 dated Jul. 30, 2018, 5 pages.
Lim Sukhwan et al., Spatially Varying Color Correction(SVCC) Matrices for Reduced Noise, Color and Imaging Conference, 12th Color and Imaging Conference Final Program and Proceedings, 2004: 76-81, 2004.
The Extended European Search Report in European Application No. 18839321.9 dated Jun. 18, 2020, 7 pages.

* cited by examiner

SYSTEMS AND METHODS FOR IMAGE PROCESSING

CROSS-REFERENCE TO RELATED APPLICATIONS

The present application is a Continuation of International Application No. PCT/CN2018/086456 filed on May 11, 2018, which claims priority of Chinese Application No. 201710631848.8, filed on Jul. 28, 2017, and Chinese Application No. 201710652831.0, field on Jul. 28, 2017. The entire contents of above applications are incorporated herein by reference in entirety.

TECHNICAL FIELD

The present disclosure generally relates to image processing, and more particularly, relates to systems and methods for identifying a color of an object based on a target image including the object.

BACKGROUND

In some fields like self-driving, aerial photography, and surveillance monitoring, an image used in these fields is required to show the true color of an object as much as possible to identify the information in the image. In some embodiments, a color correction matrix used to correct the color of the image may not reflect the actual acquisition environment of the image and may have a poor correction effect. Therefore, it may be desirable to develop systems and methods for correcting the color of an image.

In safety and security fields, content analysis on a video is of great importance. The identification of a vehicle is particularly important. However, in practice, information on the license plate of the vehicle may often not be identified due to blocking of the license plate, lacking of the license plate or several license plates of the vehicle. In this case, vehicle color identification may have effect on analysis on the vehicle. The vehicle color also plays an important role in criminal case investigation and identification for several license plates for one vehicle. The existing vehicle color identification method has a good identification effect only under specific conditions, and has a poor vehicle color identification capability due to factors such as light, and whether the license plate is blocked. Therefore, it is desirable to provide systems and methods for accurately identifying the vehicle color without being restricted by the conditions.

SUMMARY

According to an aspect of the present disclosure, a system for image processing is provided. The system may include at least one storage medium storing a set of instructions and at least one processor configured to communicate with the at least one storage medium. When executing the set of instructions, the at least one processor may be directed to cause the system to obtain a target image having RGB channels including a red channel, a green channel, and a blue channel. The at least one processor may be further directed to cause the system to estimate a noise value for each of the RGB channels and obtain a predetermined noise value for each of the RGB channels. The at least one processor may be further directed to cause the system to determine, based on the predetermined noise values, a channel correlation coefficient of the RGB channels. The at least one processor may be further directed to cause the system to correct a color of the target image based on the noise values and the channel correlation coefficient of the RGB channels.

In some embodiments, to estimate a noise value for each of the RGB channels, the at least one processor may be further directed to cause the system to obtain a width of the target image and a height of the target image. For each of the RGB channels, the at least one processor may be further directed to cause the system to perform an edge detection process for the target image and determine a number count of edge pixels of the target image based on a result of the edge detection process. The at least one processor may be further directed to cause the system to perform a convolution process on the target image to obtain a processed image and estimate the noise value for the each of the RGB channels based on the width of the target image, the height of the target image, the number count of edge pixels of the target image, and the processed image.

In some embodiments, to estimate the noise value for the each of the RGB channels based on the width of the target image, the height of the target image, the number count of edge pixels of the target image, and the processed image, the at least one processor may be further directed to cause the system to obtain internal pixels of the processed image. The internal pixels may include pixels of the processed image excluding edge pixels of the processed image. The at least one processor may be further directed to cause the system to determine an absolute value of luminance for each of the internal pixels and determine a sum value of the absolute values. The at least one processor may be further directed to cause the system to estimate the noise value for the each of the RGB channels based on the width of the target image, the height of the target image, the number count of edge pixels of the target image, and the sum value of the absolute values.

In some embodiments, to determine, based on the predetermined noise values, a channel correlation coefficient of the RGB channels, the at least one processor may be further directed to cause the system to divide the target image into a plurality of sub-images. For each of the plurality of sub-images, the at least one processor may be further directed to cause the system to determine an RGB value for each pixel in the sub-image and determine the channel correlation coefficient of the RGB channels for the sub-image based on the RGB values of the pixels in the sub-image, and the predetermined noise values.

In some embodiments, each of the plurality of sub-images may be partially overlapped with at least one of the plurality of sub-images.

In some embodiments, to correct a color of the target image based on the noise values and the channel correlation coefficient of the RGB channels, for each of the plurality of sub-images, the at least one processor may be further directed to cause the system to obtain a first correction matrix and determine a modification matrix based on the noise values and the channel correlation coefficient of the RGB channels of the sub-image. The at least one processor may be further directed to cause the system to determine a second correction matrix based on the first correction matrix and the modification matrix. The at least one processor may be further directed to cause the system to correct the color of the target image based on the second correction matrixes.

In some embodiments, to determine a modification matrix based on the noise values and the channel correlation coefficient of the RGB channels of the each of the plurality of sub-images, the at least one processor may be further directed to cause the system to, for each of the plurality of sub-images, determine a noise related parameter of the target image based on the noise values of the RGB channels. The at least one processor may be further directed to cause the system to determine the modification matrix based on the noise related parameter of the target image and the channel correlation coefficient of the RGB channels of the sub-image.

In some embodiments, to determine the modification matrix based on the noise related parameter of the target image and the channel correlation coefficient of the RGB channels of the each of the plurality of sub-images, the at least one processor may be further directed to cause the system to adjust the modification matrix by adjusting the noise related parameter of the target image based on the noise values of the RGB channels, until all values on principal diagonals of the modification matrix are greater than or equal to zero.

In some embodiments, to correct the color of the target image based on the second correction matrixes, the at least one processor may be further directed to cause the system to, for each pixel of the target image, determine at least one related second correction matrix from the second correction matrixes, wherein the at least one related second correction matrix corresponding to at least one sub-images that the pixel locates in. The at least one processor may be further directed to cause the system to determine a weighted second correction matrix based on a position of the pixel and at least one position of the at least one sub-images that the pixel locates in and correct a color of the pixel based on the weighted second correction matrix.

According to another aspect of the present disclosure, a method for image processing is provided. The method may include obtaining a target image having RGB channels including a red channel, a green channel, and a blue channel. The method may also include estimating a noise value for each of the RGB channels and obtaining a predetermined noise value for each of the RGB channels. The method may further include determining, based on the predetermined noise values, a channel correlation coefficient of the RGB channels and correcting a color of the target image based on the noise values and the channel correlation coefficient of the RGB channels.

According to another aspect of the present disclosure, a system for identifying a color of an object is provided. The system may include at least one storage medium storing a set of instructions and at least one processor configured to communicate with the at least one storage medium. When executing the set of instructions, the at least one processor may be directed to cause the system to obtain a target image including the object and identify in the target image a region of interest (ROI) including the object. The at least one processor may be further directed to cause the system to identify at least one sub-region of the object from the ROI of the object and determine at least one first characteristic vector respectively corresponding to the at least one sub-region. The at least one processor may be further directed to cause the system to determine a second characteristic vector of the ROI of the object and identify, based on the at least one first characteristic vector and the second characteristic vector, the color of the object using a color identification model.

In some embodiments, to obtain the target image, the at least one processor may be further directed to cause the system to determine whether a format of the target image is a Red-Green-Blue (RGB) format. In response to a determination that the format of the target image is not the RGB format, the at least one processor may be further directed to cause the system to transform the format of the target image into the RGB format.

In some embodiments, the target image may include RGB channels including a red channel, a green channel, and a blue channel. The at least one processor may be further directed to cause the system to estimate a noise value for each of the RGB channels and obtain a predetermined noise value for each of the RGB channels. The at least one processor may be further directed to cause the system to determine, based on the predetermined noise values, a channel correlation coefficient of the RGB channels. The at least one processor may be further directed to cause the system to correct a color of the target image based on the noise values and the channel correlation coefficient of the RGB channels.

In some embodiments, to determine, based on the predetermined noise values, a channel correlation coefficient of the RGB channels, the at least one processor may be further directed to cause the system to divide the target image into a plurality of sub-images. For each of the plurality of sub-images, the at least one processor may be further directed to cause the system to determine an RGB value for each pixel in the sub-image and determine the channel correlation coefficient of the RGB channels for the sub-image based on the RGB values of the pixels in the sub-image and the predetermined noise values.

In some embodiments, to correct the color of the target image based on the noise values and the channel correlation coefficient of the RGB channels, the at least one processor may be further directed to cause the system to, for each of the plurality of sub-images, obtain a first correction matrix. The at least one processor may be further directed to cause the system to determine a modification matrix based on the noise values and the channel correlation coefficient of the RGB channels of the each of the plurality of sub-images and determine a second correction matrix based on the first correction matrix and the modification matrix. The at least one processor may be further directed to cause the system to correct the color of the target image based on the second correction matrixes.

In some embodiments, to determine the modification matrix based on the noise related parameter of the target image and the channel correlation coefficient of the RGB channels of the each of the plurality of sub-images, the at least one processor may be further directed to cause the system to adjust the modification matrix by adjusting the noise related parameter of the target image based on the noise values of the RGB channels, until all values on principal diagonals of the modification matrix are greater than zero.

In some embodiments, to correct the color of the target image based on the second correction matrixes, the at least one processor may be further directed to cause the system to, for each pixel of the target image, determine at least one related second correction matrix from the second correction matrixes. The at least one related second correction matrix may correspond to at least one sub-images that the pixel locates in and determine a weighted second correction matrix based on a position of the pixel and at least one position of the at least one sub-images that the pixel locates in. The at least one processor may be further directed to cause the system to correct a color of the pixel based on the weighted second correction matrix.

In some embodiments, to determine the at least one first characteristic vector, for each of the at least one sub-region, the at least one processor may be further directed to cause the system to determine, based on a first convolution operation, a first pooling matrix for the sub-region. The at least one processor may be further directed to cause the system to determine a first row vector for the sub-region by performing a first full connection operation to the first pooling matrix and designate the first row vector as the first characteristic vector.

In some embodiments, to determine, based on the first convolution operation, a first pooling matrix for the sub-region, the at least one processor may be further directed to cause the system to, for each of the at least one sub-region, determine a first pixel matrix based on a pixel value of each pixel of the sub-region. The at least one processor may be further directed to cause the system to determine a first number of convolution kernels of the sub-region and perform the first number of times of convolution operation to the sub-region to obtain the first pooling matrix.

In some embodiments, to determine a second characteristic vector of the ROI of the object, the at least one processor may be further directed to cause the system to determine, based on a second convolution operation, a second pooling matrix for the ROI of the object. The at least one processor may be further directed to cause the system to determine a second row vector for the ROI of the object by performing a second full connection operation to the second pooling matrix and designate the second row vector as the second characteristic vector.

In some embodiments, to determine, based on a second convolution operation, a second pooling matrix for the ROI of the object, the at least one processor may be further directed to cause the system to determine a second pixel matrix based on a pixel value of each pixel of the ROI of the object. The at least one processor may be further directed to cause the system to determine a second number of convolution kernels of the ROI of the object and perform the second number of times of convolution operation to the ROI of the object to obtain the second pooling matrix.

In some embodiments, to identify the color of the object using the color identification model, the at least one processor may be further directed to cause the system to determine a characteristic vector of the object by combining a plurality of first characteristic vectors and the second characteristic vector. The at least one processor may be further directed to cause the system to determine, based on the characteristic vector of the object, a plurality of confidence coefficients corresponding to a plurality of color classifications included in the color identification model. The at least one processor may be further directed to cause the system to designate the color of the object based on the plurality of confidence coefficients and the plurality of color classifications.

In some embodiments, each of the plurality of color classifications may represent a single color or a color combination.

In some embodiments, the characteristic vector of the object may be determined by randomly combining the first characteristic vectors and the second characteristic vector.

According to yet another aspect of the present disclosure, a method for identifying a color of an object is provided. The method may include obtaining a target image including the object and identifying in the target image a region of interest (ROI) including the object. The method may also include identifying at least one sub-region of the object from the ROI of the object and determining at least one first characteristic vector respectively corresponding to the at least one sub-region. The method may further include determining a second characteristic vector of the ROI of the object and identifying, based on the at least one first characteristic vector and the second characteristic vector, the color of the object using a color identification model.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
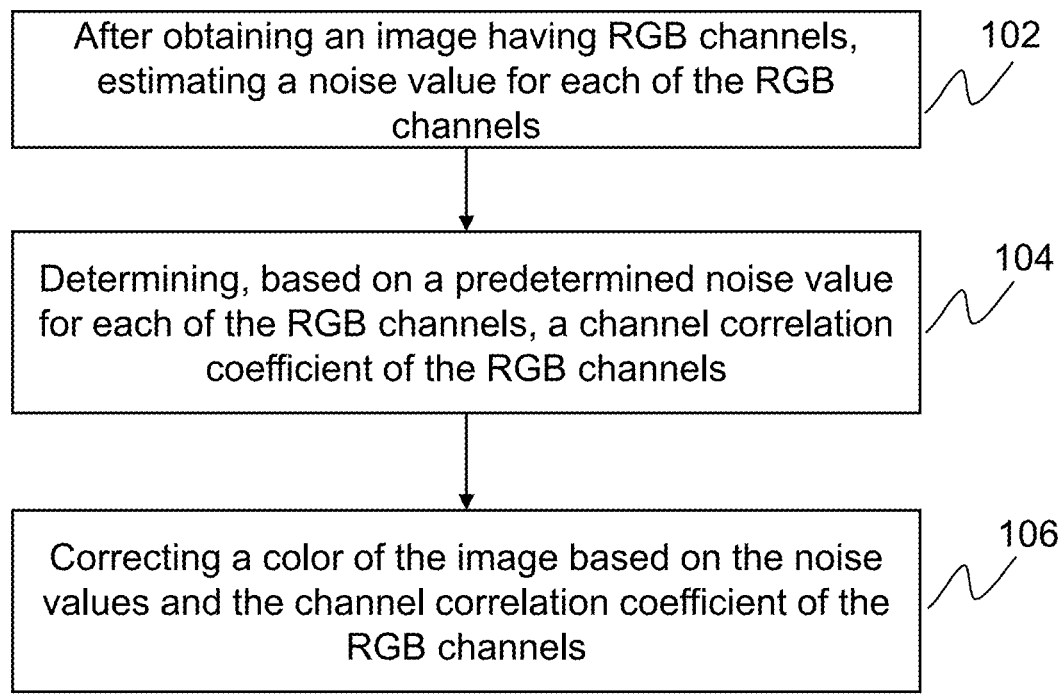
FIG. 1 is a flowchart illustrating an exemplary process of image processing according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

The present disclosure relates to systems and methods of identifying a color of an object. The methods may be implemented on a computing device. The computing device may have at least one processor (e.g., the processor 610 shown in FIG. 6 or the processor 1210 shown in FIG. 12) and at least one computer-readable storage medium (e.g., the storage 620 in FIG. 6 or the storage 1220 in FIG. 12). In some embodiments, a processor may obtain a target image and correct a color of the target image before identifying a color of an object in the target image.

As used herein, a "target image" refers to an image including the object. The processor may identify the color of the object based on the target image. The target image may be a still image or a video frame extracted from a video. In some embodiments, the target image may be a three-dimensional (3D) image or a two-dimensional (2D) image. The target image may be obtained by an image capture device. The image capture device may include a digital camera, a video camera, a surveillance camera, a web camera, a smartphone, a tablet, a laptop, a video gaming console equipped with a web camera, a camera with multiple lenses, etc.

In some embodiments of the present disclosure, after a processor obtains a target image, the processor may estimate a noise value for each of the Red-Green-Blue (RGB) channels of the target image, respectively. The processor may determine a channel correlation coefficient of the RGB channels of the target image. Then, the processor may correct the color of the target image based on the noise values and the channel correlation coefficient of the RGB channels. The noise values and the channel correlation coefficient of the RGB channels may reflect an actual acquisition environment of the target image. A color correction of the target image based on this information may have a better performance. In addition, there is no need to repeatedly calibrate the acquisition environment of the target image according to some embodiments of the present disclosure, so that labor costs can also be saved.

Hereinafter, some embodiments of the present disclosure will be further described in connection with the drawings.

FIG. 1 is a flowchart illustrating an exemplary process of image processing according to some embodiments of the present disclosure. The method may include:

In 102, the processor may obtain a target image having target RGB channels. After obtaining a target image, the processor may estimate a noise value for each of the RGB channels of the target image.

In some embodiments, after obtaining the target image, for each channel of the RGB channels of the target image, the processor may perform the following operations to the target image. The following operations may include: performing an edge detection process on the target image to determine a number count of edge pixels of the target image; performing a convolution process on the target image based on a Laplace operator; and estimating a noise value of the channel based on a width and a height of the target image, the number count of the edge pixels, and the target image after the convolution process.

For example, the processor may determine the noise value $\sigma_n$ of each channel according to the following formula (1):

$$\sigma_n = \sqrt{\frac{\pi}{2}} \frac{1}{6((W-2)(H-2) - N_{edge})} \sum_{image\ I\ exclude\ edges} |U|, \quad (1)$$

wherein W is the width of the target image; H is the height of the target image; $N_{edge}$ is the number count of the edge pixels of the target image; U is the target image after the convolution process based on the Laplace operator; $\sum_{image\ I\ exclude\ edges} |U|$ is a sum of absolute values of brightness values of pixels other than the edge pixels of the target image in U. $\sigma_R$, $\sigma_G$ and $\sigma_B$ are the noise values of the RGB channels of the target image, respectively.

In 104, the processor may determine a channel correlation coefficient of the RGB channels of the target image based on predetermined noise values of the RGB channels.

In some embodiments, the processor may divide the target image into a plurality of sub-images. For each of the plurality of sub-images, the processor may determine an RGB value for each pixel in the sub-image. The processor may further determine the channel correlation coefficient of the RGB channels for the sub-image based on the RGB values of the pixels in the sub-image, and the predetermined noise values. In some embodiments, each of the plurality of sub-images is partially overlapped with at least one of another sub-image of the plurality of sub-images. For example, the processor may divide the target image into a plurality of sub-images using an D×D window, a row step size $d_1$ and a column step size d2. The window may be initially placed at a top left corner of the target image. An area included by the window may be determined, by the processor, as a sub-image. The processor may move the window horizontally or vertically based on the row step size or the column step size. Each movement may make the window covers a new area. The processor may determine the new area as another sub-image. Each of the sub-image may have a size of D×D. As used herein, D may be an integer representing a number count of pixels. In some embodiments, $d_1$ and d2 may or may not be the same. In some embodiments, $d_1$ and d2 may be less than or equal to D/2. In some embodiments, none of the plurality of sub-images is partially overlapped with any of the plurality of sub-images.

In some embodiments, the processor may divide the target image using an D×D window, and D/2 as a row step size and a column step size. Then the processor may traverse the sub-images of the target image. For each of the traversed sub-images, the processor may determine an RGB value of each pixel in the sub-image. The processor may also determine the channel correlation coefficient of the RGB channels of the sub-image based on the RGB values of each pixel and the predetermined noise values of the RGB channels.

For example, a sub-image may include t pixels. The RGB value of each pixel may be represented by $[R_{in}\ G_{in}\ B_{in}]^T$, and the predetermined noise values of the RGB channels may be represented by $[N_R\ N_G\ N_B]^T$. The processor may determine the RGB value $[R'_{in}\ G'_{in}\ B'_{in}]^T$ of the pixel under noise using the following formula (2):

$$[R'_{in}G'_{in}B'_{in}]^T = [R_{in}+N_R G_{in}+N_G B_{in}+N_B] \tag{2}$$

The processor may further determine the channel correlation coefficient Cor of RGB channels of the sub-image according to the following formula (3):

$$Cor = \begin{bmatrix} \frac{1}{t}\sum_{i=1}^{t} R_i'^2 & \frac{1}{t}\sum_{i=1}^{t} R_i'*G_i' & \frac{1}{t}\sum_{i=1}^{t} R_i'*B_i' \\ \frac{1}{t}\sum_{i=1}^{t} R_i'*G_i' & \frac{1}{t}\sum_{i=1}^{t} G_i'^2 & \frac{1}{t}\sum_{i=1}^{t} G_i'*B_i' \\ \frac{1}{t}\sum_{i=1}^{t} R_i'*B_i' & \frac{1}{t}\sum_{i=1}^{t} G_i'*B_i' & \frac{1}{t}\sum_{i=1}^{t} B_i'^2 \end{bmatrix}, \tag{3}$$

In 106, the processor may correct a color of the target image based on the noise values and the channel correlation coefficient of the RGB channels of the target image.

Without considering unevenness of noise throughout a target image acquired by a camera, the processor may use the same color correction matrix M to correct the color of the target image. However, in reality, noise in different portions of a target image may be different. Therefore, if the processor uses the same color correction matrix M to correct the color of the target image, the correction effect of portions of the target image where noise is relatively large may be discolored or look abnormal. As a result, the actual color of the object in the target image may not be identified accurately. That may be particularly serious for an image captured in a low light situation, where the colors of objects therein are dim and noise level is high. In order to avoid the inaccuracy, the processor may determine different noise related parameters for different sub-images during the color correction process of the target image.

In some embodiments, for each sub-image, the processor may determine a modification matrix of the sub-image based on the channel correlation coefficient of the RGB channels of the sub-image and the noise values of the RGB channels of the target image. The processor may determine a second correction matrix M' of the sub-image based on the modification matrix and a first correction matrix M of the sub-image. Then, the processor may correct the color of the target image based on the second correction matrix of the sub-image.

Elements on a principal diagonal of the modification matrix can reflect whether the noise values estimation for the sub-image is appropriate. If an element on the principal diagonal is less than zero, the corrected target image may be discolored or abnormal after correcting the color of the target image base on the second modification matrix. Therefore, after determining the modification matrix of the sub-image based on the channel correlation coefficient of the RGB channels of the sub-image and the noise values of the RGB channels of the target image, the processor may modify the noise values of the RGB channels of the target image if there is an element less than zero on the principal diagonal of the modification matrix. Then the processor may repeat the operation of determining the modification matrix of the sub-image based on the channel correlation coefficient of the RGB channels of the sub-image and the noise values of the RGB channels of the target image until the value of any element on the principal diagonal of the modification matrix is greater than zero.

Figure 2:
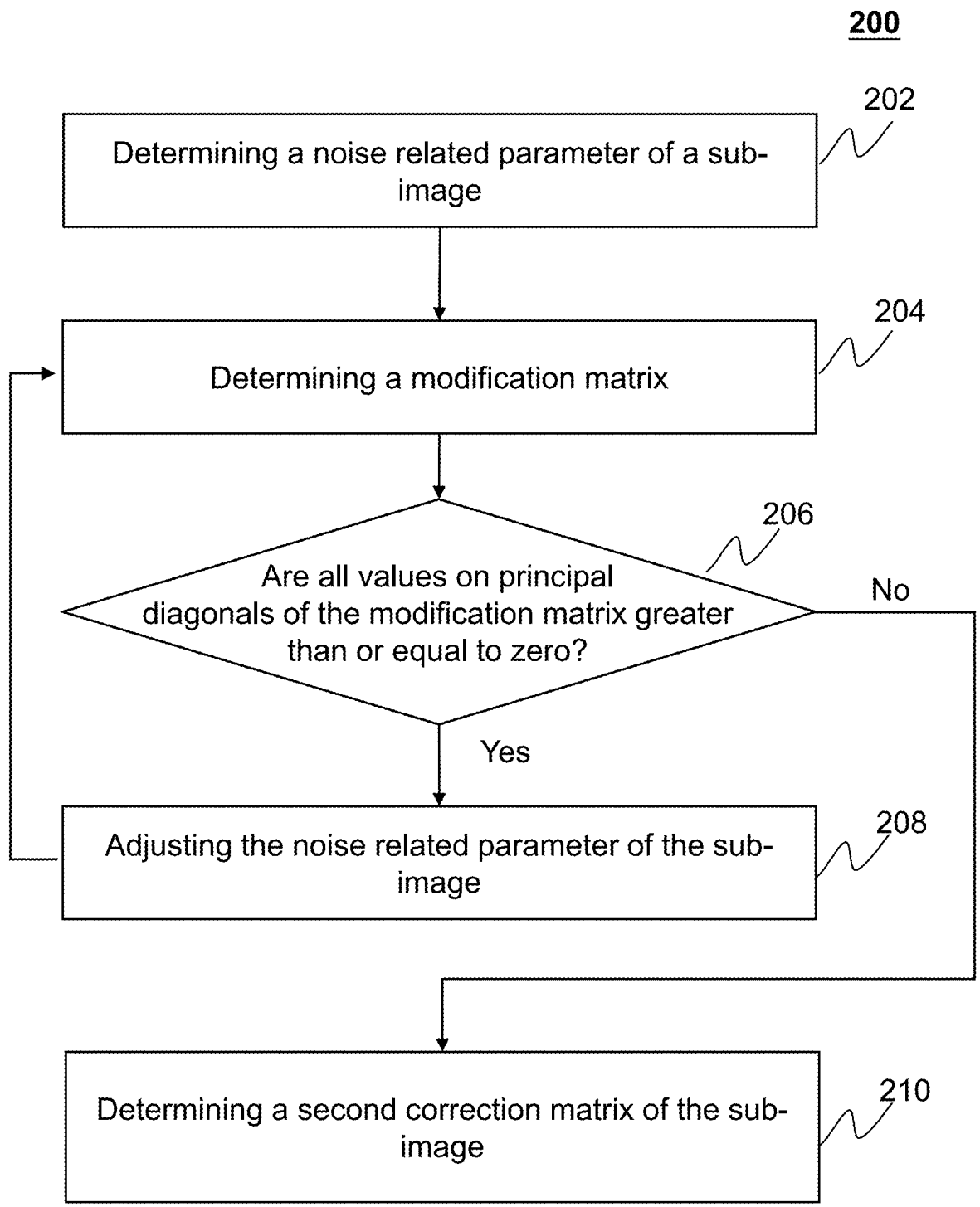
FIG. 2 is a flowchart illustrating an exemplary process of determining a second correction matrix of a sub-image according to some embodiments of the present disclosure.

FIG. 2 is a flowchart illustrating an exemplary process of determining a second correction matrix of a sub-image according to some embodiments of the present disclosure. In some embodiments, for each sub-image, the processor may determine a second correction matrix of the sub-image according to the process 200 shown in FIG. 2.

In 202, the processor may determine a noise related parameter of the sub-image.

For example, the processor may determine the noise related parameter CorNN of the target image according to the following formula (4):

$$CorNN = \text{diag}([\sigma_R^2 \sigma_G^2 \sigma_B^2]) \tag{4}$$

Initially, the processor may designate CorNN as a noise related parameter of the sub-image.

In 204, the processor may determine a modification matrix of the sub-image. For example, the processor may determine the modification matrix A of the sub-image according to the following formula (5):

$$A = Cor^{-1}*(Cor-CorNN) \tag{5}$$

In 206, the processor may determine whether an element on a principal diagonal of the modification matrix A whose value is less than zero. The process may proceed to 208 if an element on a principal diagonal of the modification matrix A whose value is less than zero. The process may proceed to 210 if no element on a principal diagonal of the modification matrix A whose value is less than zero.

In 208, the processor may modify the noise related parameter of the sub-image and return to 204. The processor may update the noise related parameter CorNN of the sub-image according to the following formula (6):

$$CorNN = CorNN \begin{bmatrix} w_1 & 0 & 0 \\ 0 & w_2 & 0 \\ 0 & 0 & w_3 \end{bmatrix}, \tag{6}$$

wherein $w_1=1/\sigma_R$, $w_2=1/\sigma_G$, and $w_3=1/\sigma_B$. Values of $w_1$, w2 and w3 may vary in a range of [0.25, 0.5].

In 210, the processor may determine a second correction matrix of the sub-image. For example, the processor may determine the second correction matrix M' of the sub-image according to the following formula (7):

$$M' = M * A^T \quad (7),$$

In some embodiments, after obtaining a plurality of second correction matrixes of the plurality of sub-images, the processor may traverse pixels of the target image. For each of the traversed pixels, the processor may determine weights corresponding to second correction matrixes of L sub-image(s), wherein each of the L sub-image(s) may cover the pixel. The processor may determine the L sub-image(s) based on a coordinate of the pixel in the target image. Then, the processor may determine a weighed second correction matrix of the pixel based on the second correction matrix(es) of the L sub-image(s) and the corresponding weights. Further, the processor may determine the color of the pixel based on the weighed second correction matrix of the pixel.

For example, when L=4, for each of the traversed pixels, the processor may determine the weights corresponding to the second correction matrixes of four sub-images covering the pixel according to the following formulas (8)-(11):

$$p_1 = \frac{(d-x)(d-y)}{d^2}, \quad (8)$$

$$p_2 = \frac{x(d-y)}{d^2}, \quad (9)$$

$$p_3 = \frac{(d-x)y}{d^2}, \text{ and} \quad (10)$$

$$p_4 = \frac{xy}{d^2}, \quad (11)$$

wherein (x,y) is the coordinate of the pixel in the target image; d=N/2; $p_1$ is the weight of the second correction matrix of a top left sub-image; $p_2$ is the weight of the second correction matrix of a top right sub-image; $p_3$ is the weight of the second correction matrix of a bottom left sub-image; and $p_4$ is the weight of the second correction matrix of a bottom right sub-image.

Then, the weighed second correction matrix $M'_i$ of the pixel may be determined according to the following formula (12):

$$M'_i = p_1 M'_1 + p_2 M'_2 + p_3 M'_3 \quad (12),$$

wherein $M'_1$, $M'_2$, $M'_3$, and $M'_4$ are the second correction matrixes of the top left sub-image, the top right sub-image, the bottom left sub-image, and the bottom right sub-image, respectively.

When the processor does not divide the target image into a plurality of sub-images, the processor may use a same second correction matrix for the target image. The processor may correct the color of each pixel in the target image based on the same second correction matrix.

In some embodiments, none of the plurality of sub-images is partially overlapped with any of the other sub-images of the plurality of sub-images. Each pixel in the target image may be covered by only one sub-image. Accordingly, L may be equal to 1. For each pixel in the target image, the processor may correct the color of the pixel based on the second correction matrix of the sub-image that covers the pixel.

In some embodiments, after obtaining a target image, the processor may estimate a noise value for each of the RGB channels of the target image. The processor may also determine a channel correlation coefficient of the RGB channels of the target image. Then, the processor may correct the color of the target image based on the noise values and the channel correlation coefficient of the RGB channels of the target image. The noise values and the channel correlation coefficient of the RGB channels of the target image may reflect the actual acquisition environment of the target image. Thus color correction of the target image based on this information may have a better effect. In addition, the processor may only calibrate the acquisition environment for one time to obtain the first correction matrix. Because no repeating calibration is needed, labor costs can also be saved.

Herein, the present disclosure may first introduce a process of obtaining a second correction matrix of an image. In some embodiments, when correcting the color of the target image, an RGB value of each pixel in the target image usually includes noise. The noise may be assumed to be white Gaussian noise, then:

$$C'_{in} = C_{in} + N \quad (13),$$

wherein $C'_{in} = [R'_{in} \ G'_{in} \ B'_{in}]^T$, and $C'_{in}$ is the RGB value of the pixel with noise; $C_{in} = [R_{in} \ G_{in} \ B_{in}]^T$, and $C_{in}$ is the RGB value of the pixel without noise; and $N = [N_R \ N_G \ N_B]T$, and N is the noise value of RGB channels of the preset white Gaussian noise.

Then, the modified color correction formulas (14) are:

$$\begin{bmatrix} R'_{out} \\ G'_{out} \\ B'_{out} \end{bmatrix} = M' \times \begin{bmatrix} R'_{in} \\ G'_{in} \\ B'_{in} \end{bmatrix}, \begin{bmatrix} R_{out} \\ G_{out} \\ B_{out} \end{bmatrix} = M \times \begin{bmatrix} R_{in} \\ G_{in} \\ B_{in} \end{bmatrix}, \quad (14)$$

$$\begin{bmatrix} N'_R \\ N'_G \\ N'_B \end{bmatrix} = M' \times \begin{bmatrix} R'_{in} \\ G'_{in} \\ B'_{in} \end{bmatrix}, \begin{bmatrix} R^*_{out} \\ G^*_{out} \\ B^*_{out} \end{bmatrix} = M' \times \begin{bmatrix} R_{in} \\ G_{in} \\ B_{in} \end{bmatrix},$$

wherein M is the first correction matrix (the color correction matrix) of the target image; M' is the second correction matrix of the target image; $[R^*_{out} \ G^*_{out} \ B^*_{out}]^T$ is the corrected RGB value of the pixel of the target image after a correction, based on M', of the RGB value of the pixel of the target image with no noise; and $[N'_R \ N'_G \ N'_B]$ is the corrected noise value of the pixel after a correction, based on M', of the predetermined noise value of the RGB channels.

The formula (13) may be combined with the modified color correction formulas (14) to obtain the following formula (15):

$$\begin{bmatrix} R'_{out} \\ G'_{out} \\ B'_{out} \end{bmatrix} = \begin{bmatrix} R^*_{out} \\ G^*_{out} \\ B^*_{out} \end{bmatrix} + \begin{bmatrix} N'_R \\ N'_G \\ N'_B \end{bmatrix}. \quad (15)$$

Hereinafter, a process of determining the second correction matrix is described by taking the G channel of the target image as an example.

It is assumed that $G_{out} = \alpha R_{in} + \beta G_{in} + \gamma B_{in}$, wherein α, β, and γ are coefficients of the first correction matrix M in the case that there is no noise; and $G'_{out} = \alpha' R_{in} + \beta' G'_{in} + \gamma' B'_{in}$, wherein α', β', and γ' are coefficients of the second correction matrix M' in the case that there is noise. In order to determine the coefficients of M', the processor may apply the following formula (16):

$$M' = \underset{M'}{\operatorname{argmin}}(E(G^*_{out} - C_{out} + N'_G)^2). \tag{17}$$

The formula (15) may be combined with the formula (16) to obtain the following formula (17):

$$M' = \underset{M'}{\operatorname{argmin}}(E(C'_{out} - C_{out})^2). \tag{16}$$

The processor may solve the above equation based on a least square method and obtain the following formula (18):

$$\begin{bmatrix} \alpha' \\ \beta' \\ \gamma' \end{bmatrix} = (Cor)^{-1}(Cor - CorNN)\begin{bmatrix} \alpha \\ \beta \\ \gamma \end{bmatrix}. \tag{18}$$

The processor may transpose the formula (18) and obtain the following formula (19):

$$[\alpha'\beta'\gamma'] = [\alpha\beta\gamma](Cor - CorNN)^T(Cor^{-1})^T \tag{19},$$

wherein Cor is the channel correlation coefficient of the RGB channels, and CorNN is the noise related parameter of the target image.

Similarly, the processor may determine the coefficients of the second correction matrix M' of the R channel and the B channel to obtain the second correction matrix M' using the following formula (20):

$$M'=M(Cor-CorNN)^T(Cor^{-1})^T \tag{20},$$

Figure 3:
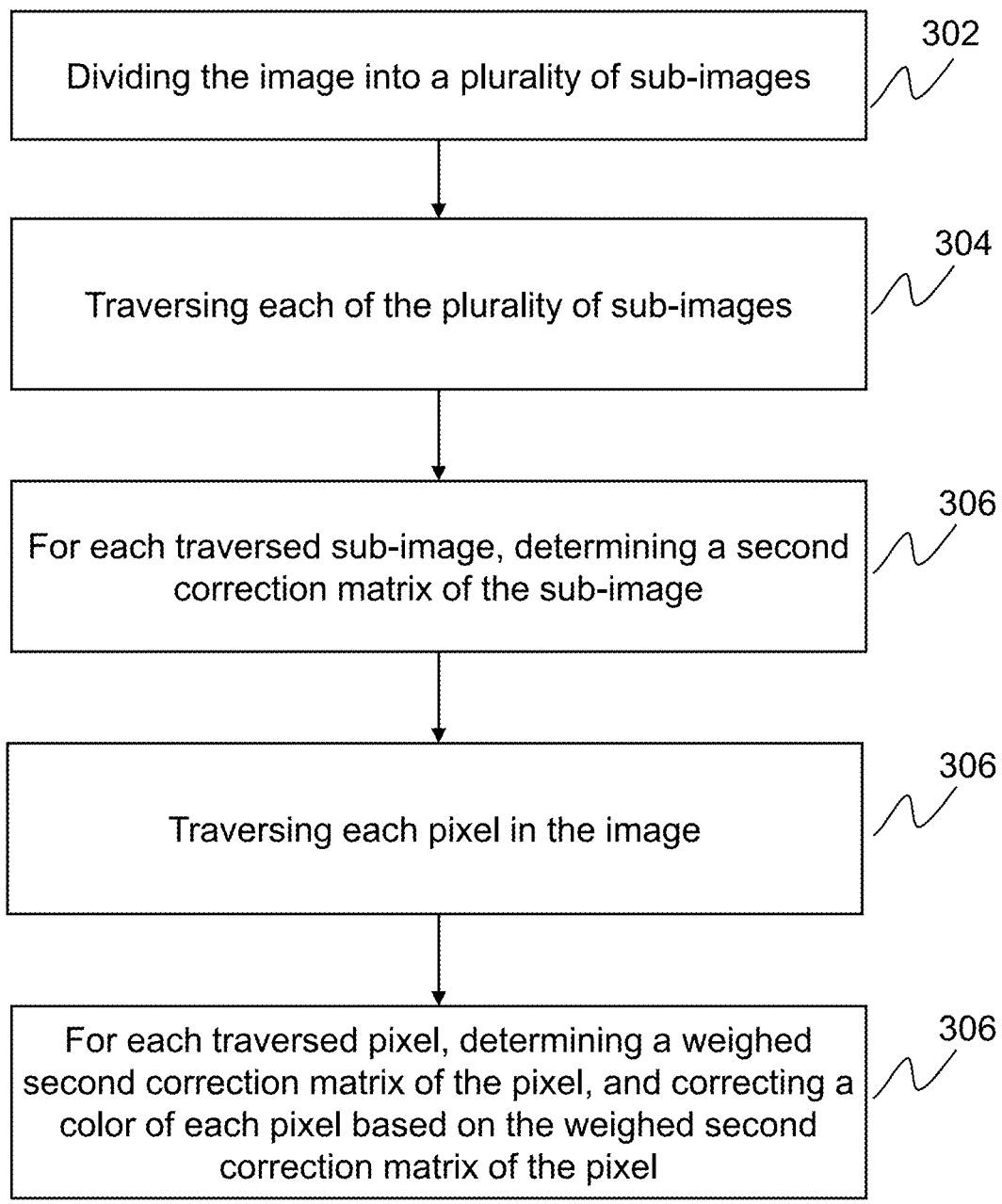
FIG. 3 is a flowchart illustrating an exemplary process of correcting a color of a target image according to some embodiments of the present disclosure.

FIG. 3 is a flowchart illustrating an exemplary process of correcting a color of a target image according to some embodiments of the present disclosure. According to the above process, in some embodiments, the processor may correct the color of the target image according to the process 300 shown in FIG. 3, including the following operations:

In 302, the processor may divide the target image into a plurality of sub-images. In some embodiments, the processor may divide the target image using a D×D window and designate D/2 as a row operation size and a column operation size. Dividing the target image into a plurality of sub-images overlapping with each other may make the color of the target image distribute smoothly and decrease inhomogeneity of the color of the target image.

In 304, the processor may traverse each of the plurality of sub-images.

In 306, for each traversed sub-image, the processor may determine a second correction matrix M' of the sub-image. For each of the plurality of sub-images, the processor may determine a channel correlation coefficient Cor of RGB channels of the sub-image according to the following formula (3):

$$Cor = \begin{bmatrix} \frac{1}{t}\sum_{i=1}^{t} R'^2_i & \frac{1}{t}\sum_{i=1}^{t} R'_i * G'_i & \frac{1}{t}\sum_{i=1}^{t} R'_i * B'_i \\ \frac{1}{t}\sum_{i=1}^{t} R'_i * G'_i & \frac{1}{t}\sum_{i=1}^{t} G'^2_i & \frac{1}{t}\sum_{i=1}^{t} G'_i * B'_i \\ \frac{1}{t}\sum_{i=1}^{t} R'_i * B'_i & \frac{1}{t}\sum_{i=1}^{t} G'_i * B'_i & \frac{1}{t}\sum_{i=1}^{t} B'^2_i \end{bmatrix}, \tag{3}$$

wherein t is the number of the pixels in the sub-image. $[R'_n\ G'_n\ B'_{in}]^T$ is the RGB value of the pixel in the target image in a case that there is noise; $[R_n\ G_n\ B_{in}]^T$ is the RGB value of the pixel in the target image without noise. $[R'_n\ G'_n\ B'_{in}]^T = [R_{in}+N_R\ G_{in}+N_G\ B_{in}+N_B]$, wherein $[N_R\ N_G\ N_B]T$ are predetermined noise values of the RGB channels of the target image.

For any channel of the RGB channels, the processor may determine the number of the edge pixels in the target image by performing an edge detection process on the target image. The processor may obtain an image U by performing a convolution process on the target image based on the Laplace operator. Then, the processor may determine the noise value of the channel according to the following formula (1):

$$\sigma_n = \sqrt{\frac{\pi}{2}}\ \frac{1}{6((W-2)(H-2)-N_{edge})} \sum_{image\ I\ exclude\ edges} |U|, \tag{1}$$

wherein W is the width of the target image; H is the height of the target image; $\Sigma_{image\ I\ exclude\ edges}\ |U|$ is a sum of absolute values of brightness values of pixels other than the edge pixels in U; n represents a channel of R, G, or B.

The processor may further determine a noise related parameter CorNN of the target image according to the following formula (4):

$$CorNN=diag([\sigma_R^2 \sigma_G^2 \sigma_B^2]) \tag{4},$$

wherein $\sigma_R$, $\sigma_G$ and $\sigma_B$ are the noise values of the RGB channels of the target image, respectively. The processor may then determine the second correction matrix M' of the sub-image according to the following formula (20):

$$M'=M(Cor-CorNN)^T(Cor^{-1})^T \tag{20},$$

wherein M is the first correction matrix. The above noise related parameter CorNN is with respect to the whole target image. After the processor dividing the target image into the plurality of sub-images, the noise of each of the plurality of sub-images may not be the same. If the processor determines the second correction matrix of each sub-image according to the above noise related correlation matrix, abnormity or color cast may occur to some of the plurality of sub-images. In order to avoid the above disadvantages, the processor may designate $M'=MA^T$, wherein $A=Cor^{-1}*(Cor-CorNN)$, and A is the modification matrix. The processor may then determine whether the above noise related correlation matrix may cause the abnormity or color cast of the sub-image based on elements on a principal diagonal of the modification matrix.

In some embodiments, if an element whose value is less than zero is on principal diagonal of the modification matrix A, the second correction matrix determined based on the above noise related parameter may cause color cast of the sub-image. Therefore, after obtaining the modification matrix A of the sub-image in the above process, if it is determined that an element whose value is less than zero is on the principal diagonal of the modification matrix A, the noise related parameter CorNN can be updated according to the following formula (6):

$$CorNN = CorNN \begin{bmatrix} w_1 & 0 & 0 \\ 0 & w_2 & 0 \\ 0 & 0 & w_3 \end{bmatrix}, \tag{6}$$

wherein $w_1=1/\sigma_R$, $w_2=1/\sigma_G$, and $w_3=1/\sigma_B$. The values of WI, W2 and W3 may vary according to a value range [0.25, 0.5].

Then, according to the formula (5) A=Cor$^{-1}$*(Cor−CorNN), the processor may re-determine the modification matrix A. The processor may repeat the above operations until the value of any element on the principal diagonal A of the correction matrix is greater than zero. The processor may then determine the second correction matrix of the sub-image according to M'=M$^{AT}$.

In 308, the processor may traverse each pixel in the target image.

In 310, for each traversed pixel, the processor may determine a weighed second correction matrix of the pixel and correct the color of the pixel based on the weighed second correction matrix of the pixel.

In some embodiments, the processor may divide the target image into the plurality of sub-images and determine the second correction matrix of each of the sub-images. In order to avoid a block effect between the plurality of sub-images, the processor may utilize a bi-linear interpolation method to obtain the weighed second correction matrix of a pixel covered by an overlapping area of two or more of the sub-images when correcting the color of the target image.

Figure 4:
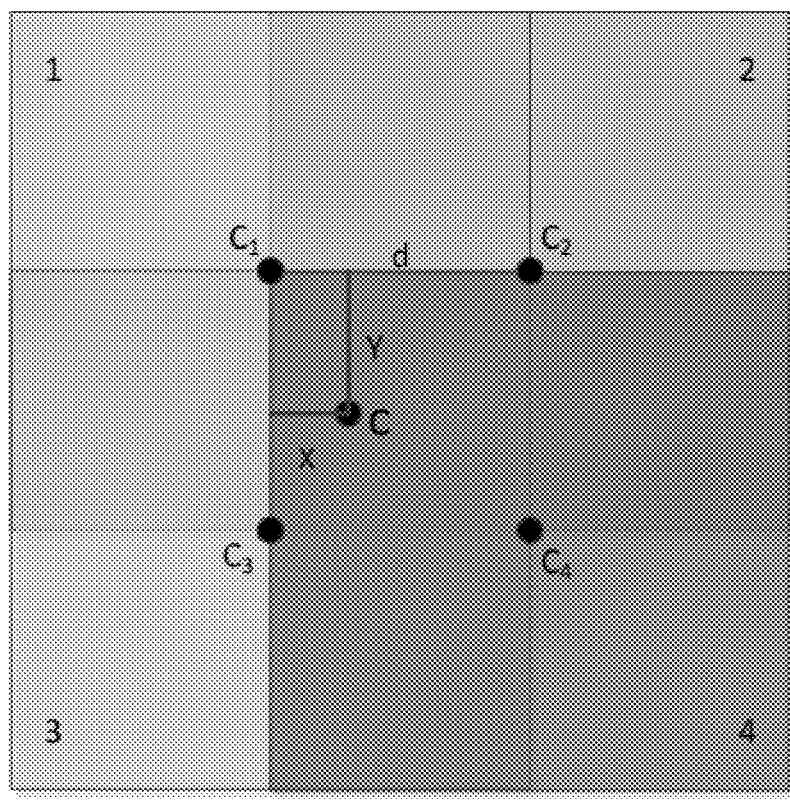
FIG. 4 is a schematic diagram of determining a weighed second correction matrix of each pixel according to some embodiments of the present disclosure.

FIG. 4 is a schematic diagram of determining a weighed second correction matrix of each pixel according to some embodiments of the present disclosure. An image block in the middle of FIG. 4 has a size of D/2×D/2, and is covered simultaneously by a top left sub-image 1, a top right sub-image 2, a bottom left sub-image 3 and a bottom right sub-image 4. Second correction matrixes of the sub-image 1, the sub-image 2, the sub-image 3 and the sub-image 4 may be M'$_1$, M'$_2$, M'$_3$, and M'$_4$, respectively. For each pixel of the image block in the middle, the processor may determine the weighed second correction matrix M'$_i$ of the pixel according to the following formulas (8)-(11):

$$p_1 = \frac{(d-x)(d-y)}{d^2}, \quad (8)$$

$$p_2 = \frac{x(d-y)}{d^2}, \quad (9)$$

$$p_3 = \frac{(d-x)y}{d^2}, \text{ and} \quad (10)$$

$$p_4 = \frac{xy}{d^2}, \quad (11)$$

wherein (x,y) is the coordinate of the pixel in the target image; d=N/2; $p_1$, $p_2$, $p_3$, and $p_4$ are the weights of the second correction matrixes of the sub-image 1, the sub-image 2, the sub-image 3 and the sub-image 4, respectively.

The processor may further correct the color of the pixel according to the following formula (21):

$$C_{out}=M'_i \times C_{in} \quad (21),$$

wherein $C_{in}=[R_{in}\ G_{in}\ B_{in}]^T$, and $C_{in}$ is the brightness value of the RGB channels of the pixel before color correction; and $C_{out}=[R_{out}\ G_{out}\ B_{out}]^T$, and $C_{out}$ is the brightness value of the RGB channels of the pixel after color correction.

Based on the same inventive concept, some embodiments of the present disclosure further provide an image processing device corresponding to the image processing method of correcting a color of a target image. Since the principle of the device is similar to the image processing method of correcting the color of the target image, the implementation of the device can refer to the implementation of the method. The repetitive parts will not be described herein.

Figure 5:
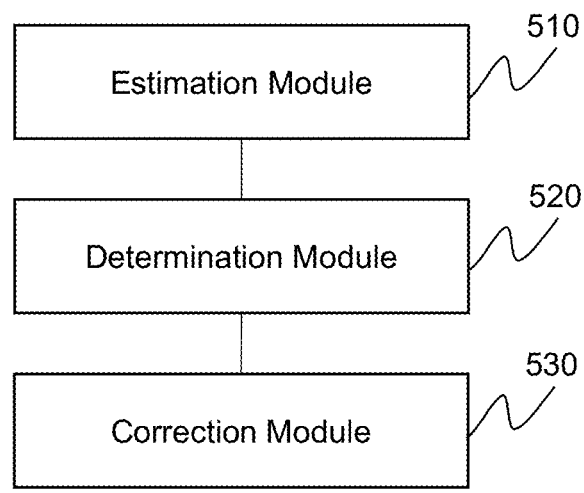
FIG. 5 is a schematic block diagram of an exemplary image processing device according to some embodiments of the present disclosure.

FIG. 5 is a schematic block diagram of an exemplary image processing device according to some embodiments of the present disclosure. The image processing device may include: an estimation module 510, configured to estimate a noise value for each of the RGB channels of the target image after a target image is obtained; a determination module 520, configured to determine a channel correlation coefficient of the RGB channels of the target image based on predetermined noise values of the RGB channels; and a correction module 530, configured to correct a color of the target image based on the noise values of the RGB channels and the channel correlation coefficient of the RGB channels of the target image.

In some embodiments, the estimation module 510 may be configured to: for each of the RGB channels, determine the number count of the edge pixels by performing an edge detection process on the target image; perform a convolution process on the target image based on a Laplace operator; and estimate a noise value of the channel based on a width and a height of the target image, the number count of the edge pixels, and the target image after the convolution process.

The processor may determine the noise value of any of the RGB channels according to the following formula (1):

$$\sigma_n = \sqrt{\frac{\pi}{2}} \frac{1}{6((W-2)(H-2)-N_{edge})} \sum_{image\ 1\ exclude\ edges} |U|, \quad (1)$$

wherein W is the width of the target image; H is the height of the target image; $N_{edge}$ is the number count of the edge pixels of the target image; U is the target image after the convolution process; and |U| is the sum of the absolute values of the brightness values of the pixels other than the edge pixels in U.

In some embodiments, the determination module 520 may be configured to: divide the target image into a plurality of sub-images using a D×D window, and designate D/2 as a row operation size and a column operation size, wherein D is a natural number; traverse each of the sub-images of the target image; for each traversed sub-image, determine an RGB value of each pixel; and determine a channel correlation coefficient of RGB channels of the sub-image based on the RGB value of each pixel and predetermined noise values of the RGB channels.

In some embodiments, the correction module 530 may be configured to: for each of the sub-images, determine a modification matrix of the sub-image based on the channel correlation coefficient of the RGB channels of the sub-image and the noise values of the RGB channels of the target image; determine a second correction matrix of the sub-image based on the modification matrix and a first correction matrix of the sub-image; and correct the color of the target image based on the second correction matrixes of the sub-images.

In some embodiments, the correction module 530 may be configured to: for each of the sub-images, after the determination of the modification matrix of the sub-image based on the channel correlation coefficient of the sub-image and the noise values of the RGB channels of the target image, modify the noise values of the RGB channels of the target image if any element whose value is less than zero is present on a principal diagonal of the modification matrix; and return to the operation of determining the modification matrix of the sub-image based on the channel correlation coefficient of the RGB channels of the sub-image and the noise values of the RGB channels of the target image unless the value of any element on the principal diagonals of the correction matrix is greater than or equal to zero.

In some embodiments, the correction module 530 may be configured to: traverse each pixel of the target image; for each of the traversed pixels, determine weights corresponding to second correction matrixes of L sub-images simultaneously covering the pixel based on a coordinate of the pixel in the target image, wherein L is an integer greater than 1; determine the weighed second correction matrix of the pixel based on the second correction matrixes of the L sub-images and the corresponding weights; and correct the color of the pixel based on the weighed second correction matrix of the pixel.

In some embodiments, if L=4, for each of the traversed pixels, the processor may determine the weights corresponding to second correction matrixes of four sub-images covering the pixel according to the following formulas (8)-(11):

$$p_1 = \frac{(d-x)(d-y)}{d^2}, \quad (8)$$

$$p_2 = \frac{x(d-y)}{d^2}, \quad (9)$$

$$p_3 = \frac{(d-x)y}{d^2}, \text{ and} \quad (10)$$

$$p_4 = \frac{xy}{d^2}, \quad (11)$$

wherein: (x,y) is the coordinate of the pixel in the target image; d=N/2; $p_1$ is the weight of the second correction matrix of a top left sub-image; $p_2$ is the weight of the second correction matrix of a top right sub-image; $p_3$ is the weight of the second correction matrix of a bottom left sub-image; and $p_4$ is the weight of the second correction matrix of a bottom right sub-image.

Figure 6:
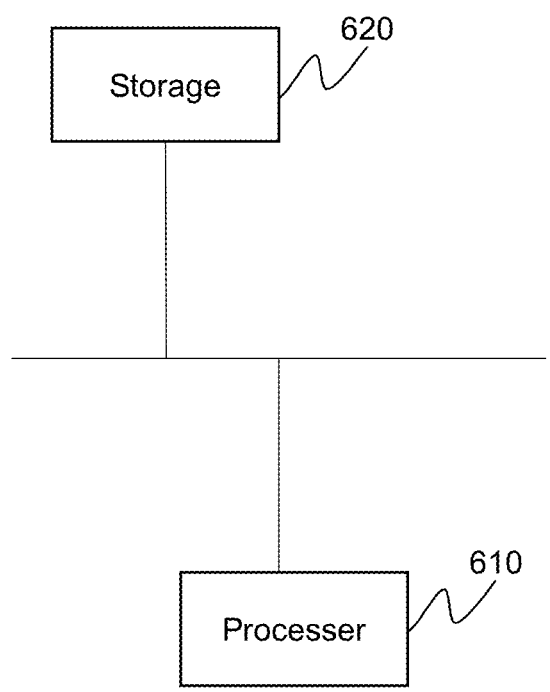
FIG. 6 is a schematic block diagram of an exemplary hardware structure of a computing device for implementing an image processing method according to some embodiments of the present disclosure.

FIG. 6 is a schematic diagram of an exemplary hardware structure of a computing device for implementing an image processing method according to some embodiments of the present disclosure. The computing device may include at least one processor 610 and at least one storage 620. The storage 620 may store program codes. When executed by the processor, the program codes may cause the computing device to perform the operations of the image processing method described above.

Some embodiments of the present disclosure provide a computer readable storage medium. The computer readable storage medium may store computer programs that can be executed by a computing device. When executed by the computing device, the computer programs may cause the computing device to perform the operations of the image processing method described above.

In another aspect of the present disclosure, methods, devices and computer readable storage mediums of identifying a color of an object is provided. The method may include obtaining a target image including the object, identifying a region of interest (ROI) including the object in the target image, identifying at least one sub-region of the object from the ROI of the object, determining at least one characteristic vector respectively corresponding to the at least one sub-region, determining a second characteristic vector of the ROI of the subject, and identify the color of the object using a color identification model based on the at least one first characteristic vector and the second characteristic vector. The image processing method of correcting a color of a target image described above may also be implemented in the process of identifying the color of the object. For example, the processor may firstly correct the color of the target image and then identify the color of the object included in the target image. In some embodiments, the object may include a vehicle, an aircraft, a ship, or the like, or any combination thereof. The vehicle is used as an example of an object for color identification in the present disclosure.

For instance, the present disclosure also provides methods, apparatuses and electronic devices of identifying a color of a vehicle. The methods, apparatuses and electronic devices provided in the present disclosure may solve the problems of low accuracy in vehicle color identification results, which are caused by factors such as unfavorable light conditions, unfavorable weather, covered license plate, etc.

Figure 7:
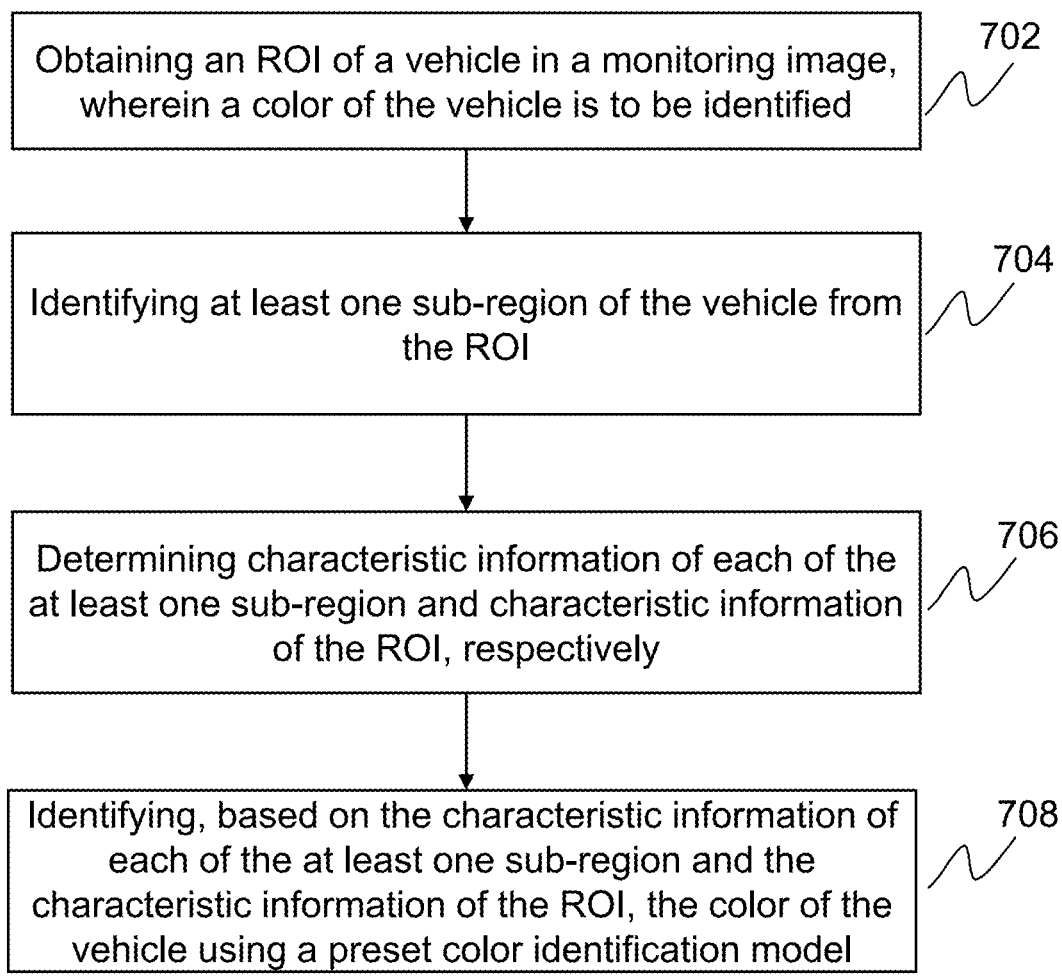
FIG. 7 is a flowchart illustrating an exemplary vehicle color identification process according to some embodiments of the present disclosure.

FIG. 7 is a flowchart illustrating an exemplary vehicle color identification process according to some embodiments of the present disclosure. The process may include the following operations:

In 702, the processor may obtain an ROI of a vehicle in a monitoring image. The color of the vehicle is to be identified. In some embodiments, if the monitoring image include the vehicle and the color of the vehicle is to be identified, the monitoring image may be referred to as a target image. The target image may be a still image or a video frame extracted from a video. The target image may be a three-dimensional (3D) image or a two-dimensional (2D) image. The target image may be obtained by the image capture device including a digital camera, a video camera, a surveillance camera, a web camera, a smartphone, a tablet, a laptop, a video gaming console equipped with a web camera, a camera with multiple lenses, etc.

In some embodiments, the processor may determine whether a format of the target image is an RGB format. If the format of the target image is not the RGB format, the processor may transform the format of the target image into the RGB format. In some embodiments, the methods of correcting a color of an object described above in the present disclore (e.g., in connection with FIGS. 1-3) may be implemented on the target image before obtaining the ROI image or before obtaining at least one sub-image. For example, the processor may estimate a noise value for each of the RGB channels of the target image, obtain a predetermined noise value for each of the RGB channels, determine a channel correlation coefficient of the RGB channels based on the predetermined noise values, and correct the color of the target image based on the noise values and the channel correlation coefficient of the RGB channels.

In some embodiments, when obtaining the ROI from the monitoring image, the processor may detect and identify a region including the vehicle (e.g., an ROI) based on vehicle detection and positioning technologies. For example, the processor may obtain a vertex coordinate (e.g., a coordinate of a vertex on top left) of the ROI using vehicle detection and positioning technologies. The processor may also determine a height and a width of the vehicle in the target image based on experience. In some embodiments, x and y may refer to a horizontal coordinate and a vertical coordinate, repectively; the width of the vehicle may be the width of the ROI; and the height of the vehicle may be the height of the ROI). Therefore, the processor may obtain the ROI of the vehicle from the target image.

In some embodiments, the vehicle detection and positioning technologies may include a deep learning algorithm. The deep learning algorithm may include but not be limited to: a Single Shot MultiBox Detector (SSD) alogorithm, a You Only Look Once (YOLO) algorithm, a Faster-rcnn, a R-FCN detection algorithm, or the like, or any combination thereof.

In some embodiments, the method of identifying the color of the vehicle may be described taking SSD as an example. Before extracting and/or identifying the ROI of the vehicle from the target image using the SSD algorithm, the processor may train a SDD model using a lot of samples including the vehicle region. The processor may extract and/or identify the ROI using the trained SDD model. The processor may determine a vertex coordinate (e.g., a coordinate of a vertex on top left (x, y)) of the ROI in the target image. The processor may determine a height and a width of the ROI in the target image based on an empiric value obtained by a lot of experimental results and finally extract and/or identify the ROI.

In some embodiments, the obtained image may be in a YUV (Luminance and Chrominance) format. Thus, in order to obtain the vehicle color identification result accurately, when performing operation 702, the processor may process the target image as follows.

Firstly, the processor may convert the format of the monitoring image into an RGB format. In some embodiments, the processor may convert the YUV-format image into an RGB-format image.

Next, the processor may obtain an ROI of the vehicle from the RGB-format image. The processor may obtain the ROI of the vehicle from the RGB-format image and thus the processor may obtain the color of the vehicle in a better effect in subsequent operations.

In 704, the processor may identify at least one sub-region of the vehicle from the ROI. In some embodiments, if the processor determines that the ROI includes a cover region and/or a bumper region, the processor may extract the cover region and/or the bumper region from the ROI. The cover region may include a front-cover region or a rear-cover region. The bumper region may include a front-bumper region or a rear-bumper region, as shown in FIGS. 8A and 8B.

Figure 8A:
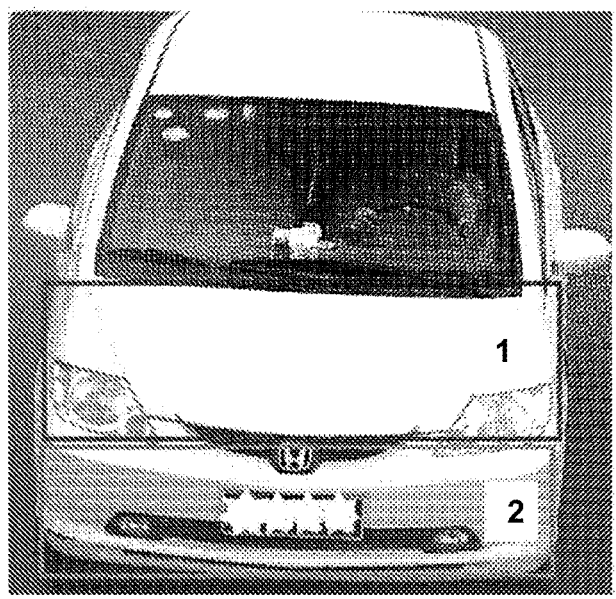
FIGS. 8A and 8B are schematic diagrams illustrating exemplary subregions of an object according to some embodiments of the present disclosure.
Figure 8B:
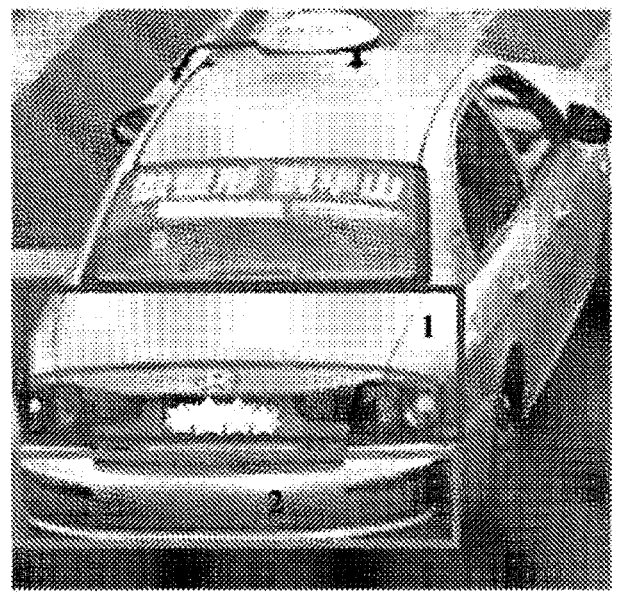

FIGS. 8A and 8B are schematic diagrams illustrating exemplary subregions of an object according to some embodiments of the present disclosure. In some embodiments, in FIG. 8A, a region denoted by "1" is a front-cover region. A region denoted by "2" is a front-bumper region. In FIG. 8B, a region denoted by "1" is a rear-cover region and a region denoted by "2" is a rear-bumper region.

In some embodiments, when the processor extracts the cover region or the bumper region from the ROI, the processor may use an algorithm inlcuding an SSD algorithm, a YOLO algorithm, a Faster-rcnn algorithm, an R-FCN detection algorithm, or the like, or any combination thereof.

In some embodiments, when extracting the front-cover region using the SSD, the processor may train an SDD model using a lot of ROI samples including the front-cover region. After training the SDD model, the processor may extract the front-cover region from an ROI of the vehicle using the trained SDD model directly. The processor may determine a vertex coordinate (x, y) of the front-cover region. The processor may determine a height and a width of the front-cover region in the ROI based on an empiric value. The processor may extract the front-cover region based on the vertex coordinate, the height and the width of the front-cover region in the ROI.

Similarly, the processor may train SDD models for the rear-cover region, the front-bumper region, and the rear-bumper region. Then the processor may extract these regions using the trained models, respectively.

Additionally, the extracting of the at least one sub-region of the vehicle from the ROI has an advantage of fast processing speed. In some embodiments, the processor may directly extract the sub-region of the vehicle from the target image, such as the bumper region. However, the extraction of the bumper region from the target image is based on a relatively large image. For example, the target image may have a size of 1000×1000. The processor may train an SSD model for extracting the bumper region from the target image. This training process may take a relatively long time (e.g, hours, days, or even weeks) and the identification result may be less satisfying. Therefore, the present disclosure proposes to extract the ROI from the target image. The ROI may be a region larger than the bumper region and thus the identification result may be better. Then the processor may train a model for extracting the bumper region from the ROI. The training speed for training the model for extracting the bumper region from the ROI may be much faster than the training speed for training the model for extracting the bumper region from the target image. The extracting speed for extracting the bumper region from the ROI may be much faster than the extracting speed for extracting the bumper region from the target image. The extracting effect for extracting the bumper region from the ROI may also be much better than the extracting effect for extracting the bumper region from the target image.

In some embodiments, when the processor extracts several sub-regions of the vehicle from the ROI, the processor may consider the impact of some factors. For example, the factors may include weather, light, etc. When the light is bright, in terms of light reflection of the vehicle, the cover region may be more light-reflective and the bumper region may be less light-reflective. The bumper region may also be less light-reflective at night. Therefore, when the ROI includes the bumper region, the processor may extract the bumper region from the ROI. The identification effect may be better and more accurate if the processor identifies the color of the vehicle using the bumper region in such cases.

In some embodiments, for vehicles with color strips and/or different colors, the vehicles may have different color combinations. As shown in FIG. 8B, the color of the vehicle is green and silver. The region denoted by "1" is green and the region denoted by "2" is silver. In another word, the vehicle in FIG. 8B has a bumper region whose color is significantly different from that of a cover region and a top region. Therefore, when the processor identifies the color of the vehicle, it may be important to extract the bumper region from the ROI. The processor may accurately identify the color of the vehicle as sliver and green based on the bumper region, the cover region and the ROI.

In addition, although the cover region may be more light-reflective when the light is bright, the cover region may be a significant region representing the color of the vehicle. Thus the processor may still use the cover region to identify the color of the vehicle. Therefore, if the processor determines that the ROI includes the cover region, the processor may extract the cover region from the ROI. The processor may combine the extracted cover region with the extracted bumper region and the ROI to obtain the color of the vehicle. Utilization of the bumper region may compensate for the problem of light-reflection of the cover region. The processor may combine the entire region of the vehicle included in the target image (e.g., the ROI) with the bumper region and the cover region. Thus the identified color of the vehicle may be more accurate.

It should be noted that the vehicle color identification method provided by the present disclosure may be implemented in the field of monitoring. Thus one camera can only shoot an image including a front or rear region of the vehicle when monitoring a vehicle. In another word, when the vehicle moves into a monitored region, a front camera provided in a monitoring system can only capture an image including a front region, such as a front-bumper region or a front-cover region of the vehicle. That is, an monitoring image may not include the front-cover region and the rear-cover region at the same time, nor the front-bumper region and the rear-bumper region at the same time.

Therefore, in some embodiments, when the processor extracts the pluarality of sub-regions of the vehicle from the ROI, the processor may just extract the front-cover region and the front-bumper region at the same time, or the rear-cover region and the rear-bumper region at the same time.

In 706, the processor may determine characteristic information of each of the sub-regions of the vehicle and characteristic information of the ROI. In some embodiments, the determining characteristic information of each of the sub-regions of the vehicle in 706 may include: for each of the sub-regions of the vehicle, determining the characteristic information of the sub-region of the vehicle using a characteristic determination model corresponding to the sub-region of the vehicle, and obtaining a characteristic vector of the sub-region of the vehicle. For example, the sub-region of the vehicle extracted in 704 may include the front-cover region and the front-bumper region. The processor may extract the characteristic information of the cover region using a characteristic determination model corresponding to the cover region. The processor may extract the characteristic information of the bumper region using a characteristic extraction model corresponding to the bumper region.

In some embodiments, various characteristic extraction models may be preset. When the processor determines the characteristic extraction model corresponding to the extracted sub-region of the vehicle, the processor may input the extracted sub-region of the vehicle to the corresponding characteristic extraction model directly. Then, the processor may determine the characteristic information of the sub-region of the vehicle using the corresponding characteristic extraction model. The processor may determine the characteristic vector of the sub-region of the vehicle based on the characteristic information of the sub-region of the vehicle.

Figure 9A:
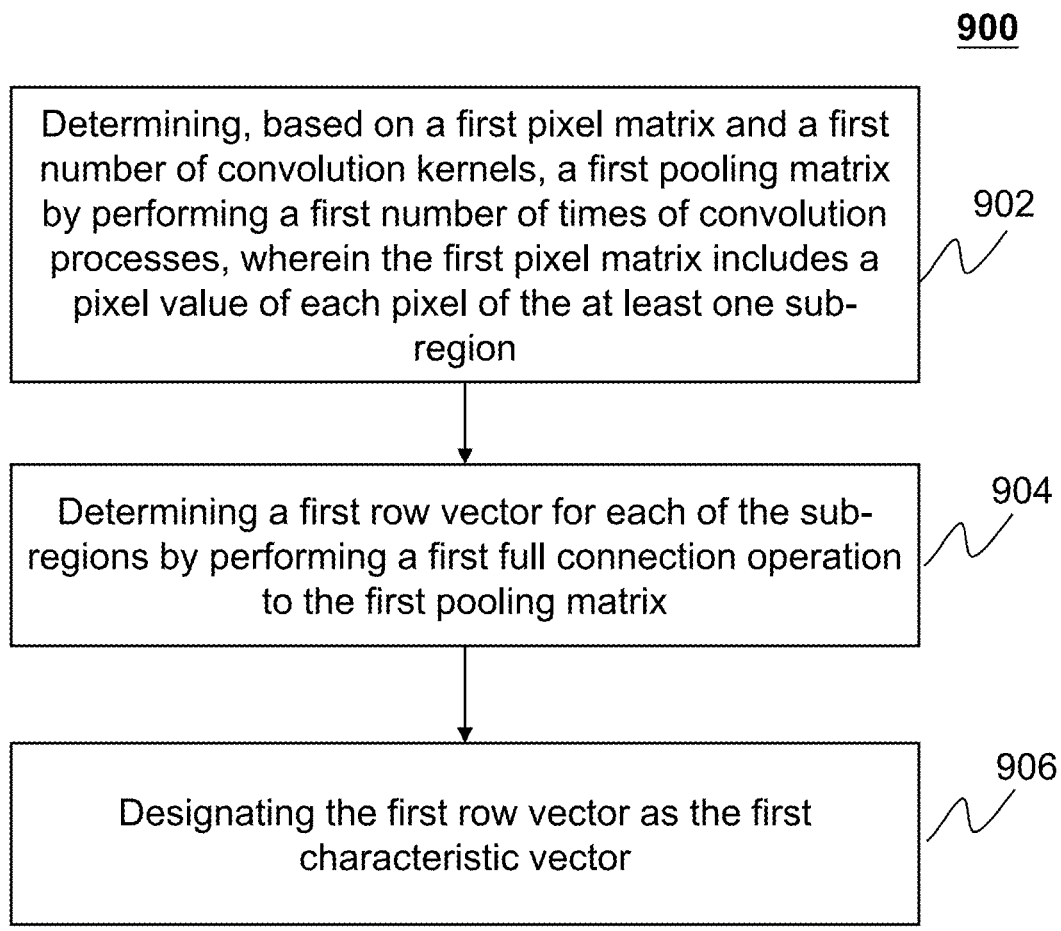
FIG. 9A is a flowchart illustrating an exemplary process of determining a first characteristic vector of the sub-region of the vehicle according to some embodiments of the present disclosure.

FIG. 9A is a flowchart illustrating an exemplary process of determining a first characteristic vector of the sub-region of the vehicle according to some embodiments of the present disclosure. The method may include the following operations:

In 902, the processor may determine a first pooling matrix of the sub-region of the vehicle. The processor may obtain the first pooling matrix by performing a corresponding number of convolution operations based on a first pixel matrix and a first number of convolution kernels. The first pixel matrix may include a pixel value of each pixel of the sub-region of the vehicle.

When the processor determines the characteristic vector of the sub-region of the vehicle, a number count of convolution operations may be equal to the first number. When the processor performs any of the convolution operationes, the processor may perform the following processes.

Taking a $K^{th}$ convolution operation as an example. The $K^{th}$ convolution operation may include following operations.

Firstly, the processor may perform a downsampling process on a convolution matrix obtained by a $(K-1)^{th}$ convolution operation. As a result of the downsampling process, the processor may obtain a downsampling matrix corresponding to the $K^{th}$ convolution.

Then, the processor may obtain a convolution matrix corresponding to the $K^{th}$ convolution operation by performing the $K^{th}$ convolution operation on the downsampling matrix corresponding to the $K^{th}$ convolution proccess using a $K^{th}$ convolution kernel.

Wherein, K may be an integer between 2 and the first number. When K is 2, the processor may obtain a convolution matrix corresponding to a $1^{st}$ convolution operation by performing a convolution operation on the first pixel matrix of the sub-region of the vehicle using a $1^{st}$ convolution kernel. When K is equal to the first number, the convolution matrix obtained by the $K^{th}$ convolution operation may be the first pooling matrix of the sub-region of the vehicle.

In some embodiments, taking the front-bumper region as an example of the sub-region of the vehicle. When performing the first convolution operation, the processor may obtain a convolution matrix from the first convolution operation by performing the first convolution operation on the first pixel matrix using the first convolution kernel. The first pixel matrix may include a pixel value of each pixel of the front-bumper region. The processor may perform the downsampling process on the convolution matrix obtained from the first convolution operation. For example, the processor may obtain an 8×8 matrix from the first convolution operation. The processor may obtain a 4×4 matrix from the downsampling process. In some embodiments, the downsampling process may be set according to actual needs. After performing the first downsampling process, the processor may perform the second convolution process on the downsampling matrix corresponding to the second convolution operation using a second convolution kernel. The processor may obtain the downsampling matrix corresponding to the second convolution operation by the downsampling process. The processor may obtain the convolution matrix of the $K^{th}$ convolution process according to the above method. The processor may perform the $K^{th}$ convolution operation on the downsampling matrix corresponding to the $K^{th}$ convolution operation using the $K^{th}$ convolution kernel until K is equal to the first number. Thus the processor may finally determine the first pooling matrix of the front-bumper region. The dimension of the pooling matrix may be the same as the dimension of the extracted characteristic vector, for example, 8×8.

Similarly, the processor may determine the first pooling matrixes of the front-cover region, the rear-bumper region or the rear-cover region according to the method for determining the first pooling matrix of the front-bumper region described above.

In some embodiments, when the processor determines the characteristic information of the sub-region of the vehicle, the dimension of the obtained first pooling matrix may not reach a predetermined dimension. In order to obtain the predetermined dimension, the processor may obtain characteristics of the predetermined dimension by performing a pooling process on the first pooling matrix using a spatial pyramid.

For example, first number may be determined based on experience based on experience. In addition, the first number may be associated with the dimension of an outputted row vector. The larger the dimension of the row vector is, the greater the first number may be. The first predtermined numer may depend on actual conditions.

In 904, the processor may determine a first row vector of the sub-region of the vehicle by performing a first full connection operation on a first pooling matrix of the sub-region of the vehicle. A plurality of first pooling matries may have the same dimension.

In some embodiments, the first pooling matrix of the front-bumper region may be the 8×8 matrix, and the matrix input to a color identification model should be a row vector. Thus the processor may need to perform the first full connection operation on the first pooling matrix of the front-bumper region to obtain a row vector of the front-bumper region. After performing the full connection processing on the 8×8 matrix, the processor may obtain a 1×64 matrix. The 1×64 matrix may be a row vector.

Similarly, the processor may obtain the first row vector corresponding to the front-cover region by performing the first full connection operation on the first pooling matrixes of the front-cover region.

In 906, the processor may designate the first row vector of the sub-region of the vehicle as a first characteristic vector of the sub-region of the vehicle. In some embodiments, the characteristic vector of the sub-region of the vehicle may include but is not limited to 64 dimensions. In some embodiments, the processor may determine characteristic information of each sub-region of the vehicle using the characteristic extraction model corresponding to the each sub-region of the vehicle. The processor may determine a first characteristic vector based on the characteristic information. The processor may input a first pixel matrix to the characteristic extraction model corresponding to the each sub-region of the vehicle. The first pixel matrix may include a pixel value of each pixel of the sub-region of the vehicle. Then the processor may extract the characteristic information using the corresponding characteristic extraction model and obtain the first characteristic vector of the each sub-region of the vehicle according to the operations 902 to 906.

For example, the processor may input a first pixel matrix of the front-bumper region to a characteristic extraction model corresponding to the front-bumper region. The characteristic extraction model may be a neural network. In the neural network, each layer may correspond to each convolution kernel. The processor may perform the first convolution operation and downsampling process. The processor may obtain a convolution matrix of the first number of times of convolution operation by performing the first number of times of convolution operation. The convolution matrix of the first number of times of convolution operation may be a first pooling matrix. The processor may output a predetermined dimension of the first characteristic vector by processing the first pooling matrix using a fully connected layer. The first characteristic vector may be a characteristic vector of the front-bumper region.

In some embodiments, the characteristic extraction model may include but is not limited to: Lenet, Alexne, GoogleNet series, a VGG16 layer, a VGG19 layer, and Deep Residual Learning and variants thereof.

The characteristic extraction model of the sub-region of the vehicle may be pre-trained. A training process may be generally as follows. Taking the front-bumper region as an example: the processor may firstly select a lot of samples of the front-bumper region. Then the processor may obtain a characteristic extraction model of the front-bumper region using a batch gradient descent method. To train the characteristic extraction model of the front-bumper region, the processor may obtain a parameter value other than the input and output values of the model, such as a weight value. For example, the processor may determine all activation values and output values in the neural network using forward propagation based on a sample of any front-bumper region. Then the processor may determine a residual error of each node in any layer of the neural network. The residual error of each node may indicate the degree of influence of the node on the residual error of the final output value. For a final output node, the processor may determine a difference between an output value generated in the neural network and an actual output value of the sample. The processor may perform calibration using the difference. For each hidden layer in the neural network, the processor may weigh the residual errors of nodes in each layer to obtain the residual error of each layer. Then the processor may perform a back propagation operation. For example, the processor may determine a partial derivative of each parameter, so that the processor may obtain each parameter value. Next, the processor may put each parameter value into the characteristic extraction model, so that the processor may obtain a trained characteristic extraction model of the front-bumper region.

Based on the same training process, the processor may obtain the characteristic extraction model of the front-cover region, the rear-cover region or the rear-bumper region.

The processor may obtain a cost function based on the samples of the front-bumper region. The cost function may include two terms, a mean square deviation term and a regularization term. The regularization term is also referred to as a weight decay term for reducing the extent of the weight and preventing overfitting.

In some embodiments, the extracting the characteristic information of the ROI in operation 906 may include: extracting the characteristic information of the ROI using the characteristic extraction model corresponding to the ROI, and obtaining the second characteristic vector of the ROI.

In some embodiments, the characteristic extraction model of the ROI and the characteristic extraction model of the sub-region of the vehicle may be the same or may be different, which is not limited in the present disclosure.

In some embodiments, regions for training the characteristic extraction models may be different. For example, the processor may use the entire region of the vehicle included in the target image to train the characteristic extraction model corresponding to the ROI. The t processor may use the sub-region of the vehicle extracted from the entire region of the vehicle to train the characteristic extraction model corresponding to the sub-region of the vehicle. Thus, parameter values (e.g., convolution kernels) in the characteristic extraction models may be different even if the two characteristic extraction models are the same type of model, for example, a Lenet model. Therefore, the trained Lenet characteristic extraction models may also be different.

Figure 9B:
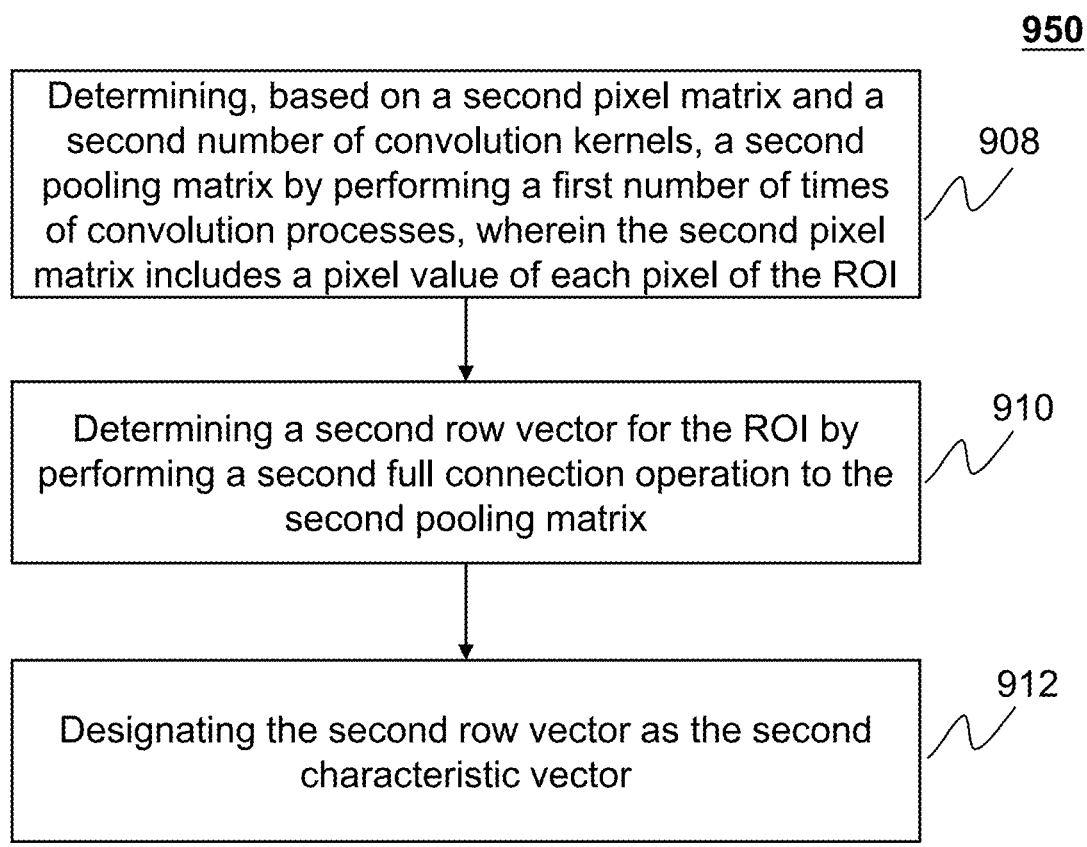
FIG. 9B is a flowchart illustrating an exemplary process of determining a second characteristic vector of the ROI of the vehicle according to some embodiments of the present disclosure.

FIG. 9B is a flowchart illustrating an exemplary process of determining a second characteristic vector of the ROI of the vehicle according to some embodiments of the present disclosure. Specifically, the characteristic vector of the ROI may be obtained by the method shown in FIG. 9B. The method may include the following operations:

In 908, the processor may determine a second pooling matrix of the ROI by performing a second number of times of convolution operation based on a second pixel matrix and a second number of convolution kernels. The second pixel matrix may inlcude a pixel value of each pixel of the ROI.

When the processor determines the second characteristic vector of the ROI, the number of the convolution operation may be equal to the second number. When performing any convolution operation, the processor may perform following operations.

Taking a $K^{th}$ convolution operation as an example. The $K^{th}$ convolution operation may include following operations: firstly, the processor may perform a downsampling process on a convolution matrix obtained by $(K-1)^{th}$ convolution operation to obtain a downsampling matrix corresponding to $K^{th}$ convolution operation; and then, the processor may perform the $K^{th}$ convolution operation on the downsampling matrix corresponding to the $K^{th}$ convolution operation using a $K^{th}$ convolution kernel to obtain a convolution matrix of the $K^{th}$ convolution operation.

In some embodiments, K may be an integer between 2 and the second number. When K is 2, the processor may obtain a convolution matrix corresponding to a $1^{st}$ convolution operation by performing a convolution operation on the pixel matrix of the ROI using a $1^{st}$ convolution kernel. When K is equal to the second number, the convolution matrix obtained by the $K^{th}$ convolution operation is the second pooling matrix of the ROI.

In some embodiments, the process of extracting the second characteristic vector of the ROI may be the same as the method for extracting the first characteristic vector of the front-bumper region as described above. The process of extracting the second characteristic vector of the ROI may refer to the method for extracting the first characteristic vector of the front-bumper region. The repetitive parts will not be described.

Specifically, the second number may be same as or different from the first number. The operator may determine the second number based on experience. In addition, the second number may be associated with the dimension of the output row vector. The larger the dimension of the row vector is, the greater the second number may be. The second number may depend on actual conditions.

In 910, the processor may perform a second full connection operation on the second pooling matrix of the ROI to obtain a second row vector of the ROI. The second row vector may have the same dimension.

Details about the operaion 910 may be similar to operation 904 and the repetitive parts will not be described.

In 912, the processor may designate the second row vector of the ROI as a second characteristic vector of the ROI. In some embodiments, the characteristic vector of the ROI may include but is not limited to 64 dimensions.

In some embodiments, when extracting the second characteristic vector using the characteristic extraction model of the ROI, the processor may input a second pixel matrix of the ROI to the characteristic extraction model. The processor may perform the second number of times of convolution operation to obtain the second pooling matrix of the ROI. It should be noted that after the processor carries out a downsampling process on a convolution matrix of a current convolution operation, the processor may use the downsampled matrix as the input of a next convolution operation until the number of times of convolution operation reaches the second number. After obtaining the convolution matrix corresponding to the second number by performing the second number of convolution operation, the processor may input the convolution matrix to a fully connected layer. The processor may designate the output of the fully connected layer as the second characteristic vector of the ROI.

In some embodiments, the characteristic extraction model of the ROI may be pre-trained, and the specific training process may refer to the training process of the front-bumper region as described above, and the repeative parts will not be described.

In some embodiments, the processor combines global characteristics and local characteristics by extracting the characteristic information of the ROI and at least one sub-region. Therefore, the method described hereinmay effectively overcome the interference of strong light on the target image. For example, the method may be particularly suitable for a vehicle with color strips, such as a taxi. Based on the above, the processor may extract characteristic information of each region using a convolutional neural network. The processor may use different network structures to extract different characteristics for different regions. Therefore, fusion of global characteristics and local characteristics may be realized and robustness of the model can be improved effectively. Further, the extracted sub-regions of the vehicle may be the bumper region and the cover region. The network after fusion may remain to be a small model, in which balance in accuracy and speed is effectively obtained, and can be applied in driving assistance.

Referring back to FIG. 7, in 708, the processor may identify the color of the vehicle using a preset color identification model based on the second characteristic vector of the ROI and the first characteristic vector of each sub-region of the vehicle.

After obtaining the second characteristic vector of the sub-region of the vehicle and the first characteristic vector of ROI by performing the operations 902 to 906 and operations 908 to 912, the processor may input the second characteristic vector and the first characteristic vector to the preset color identification model. The preset color identification model may output a confidence coefficient corresponding to each color. The processor may determine the color of the vehicle based on the confidence coefficient.

In some embodiments, the preset color identification model may be pre-trained. In particular, the processor may input a lot of samples of a vehicle to the preset color identification model and determining the weight value in the color identification model. The training of the color identification model will be described in details below.

In some embodiments, the preset color identification model may include but is not limited to: an SVM classifier, a Bayesian classifier, a decision tree classifier, and a softmax classifier, or the like.

Figure 10:
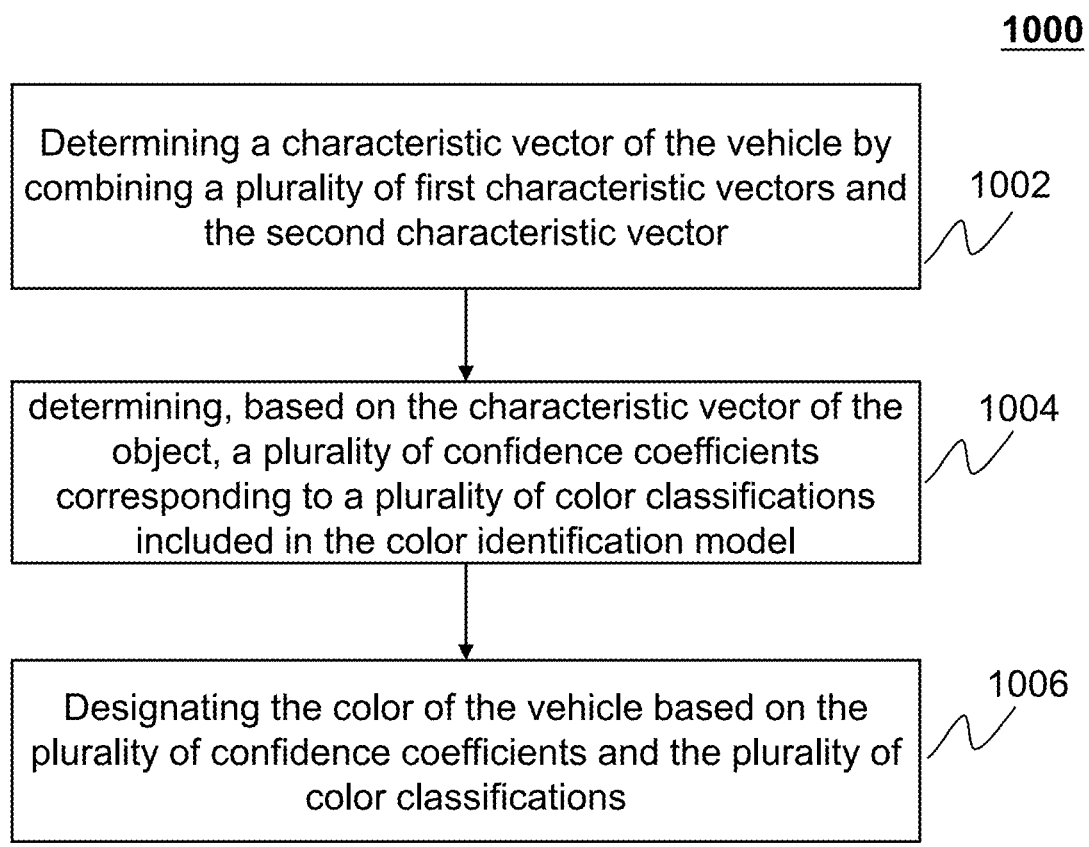
FIG. 10 is a flowchart illustrating an exemplary process of identifying the color of the vehicle according to some embodiments of the present disclosure.

FIG. 10 is a flowchart illustrating an exemplary process of identifying the color of the vehicle according to some embodiments of the present disclosure. In some embodiments, when identifying the vehicle color of the vehicle in 708, the processor may perform operation 708 according to the method in FIG. 10. The method may include the following operations:

In 1002, the processor may determine a characteristic vector of the vehicle by fusing the second characteristic vector of the ROI and the first characteristic vector of each sub-region of the vehicle.

In some embodiments, taking the front-bumper region and the front-cover region as an example. The second characteristic vector of the ROI, the first characteristic vector of the front-bumper region and the first characteristic vector of the front-cover region may be considered as three boxes. The processor may rank the three boxes randomly. The processor may designate a combination box after ranking as the characteristic vector of the vehicle.

For example, the second characteristic vector of the ROI, the first characteristic vector of the front-bumper region and the first characteristic vector of the front-cover region may be $V_1$, $V_2$, and $V_3$, respectively. The dimension of the three characteristic vectors is 64 dimensions. The processor may fuse the three characteristic vectors to obtain the characteristic vector of the vehicle. For example, $V=[V_2, V_1, V_3]$, and the dimension of V may be 192.

In some embodiments, the random ranking of the second characteristic vector of the ROI, the first characteristic vector of the front-bumper region and the first characteristic vector of the front-cover region may reduce a structural risk. Thus the color identification result obtained based on the characteristic vector using the color identification model may be more accurate.

In 1004, the processor may determine a confidence coefficient of each color stored in the preset color identification model using the preset color identification model, based on the characteristic vector of the vehicle.

The processor may input the 192-dimension characteristic vector to the preset color identification model. The processor may pre-train the preset color identification model by, for example, inputting colors of the vehicles sold in the market. Each color corresponds to a trained model. It may be understood that each color corresponds to a formula. Then the processor may input the characteristic vector of the vehicle to the formula corresponding to each color and determine an output value of the formula. Therefore, the processor may determine the confidence coefficient corresponding to the colors.

In some embodiments, the color stored in the preset color identification model may be a single color or a color combination.

Since the color input to the color identification model may be a color combination, e.g., silver-green, the vehicle color of the vehicle may be determined accurately when the vehicle is silver-green. That is, the method provided in the present disclosure can identify both a single-color vehicle and a combined-color vehicle accurately.

In 1006, the processor may determine a color whose confidence coefficient is the maximum as the color of the vehicle. When the processor determines the confidence coefficient corresponding to each color stored in the color identification model in 1004, the processor may determine a color corresponding to the maximum confidence coefficient as the color of the vehicle.

Taking a support vector machine (SVM) as an example. It should be noted that the basic principle of an SVM algorithm is classifying and predicting data based on a statistical learning theory; making an effort to find structural risk minimization and further improving the generalization ability of the learning machine, so as to achieve the minimum of experience risk and confidence scope; and finally obtaining a good learning effect even in a case of a few samples. The SVM algorithm used in the sixth embodiment of the present disclosure may be a non-linear support vector machine. Namely, a kernel function may be applied to the SVM algorithm. Firstly, linear indivisible data are mapped from an original space to a new high-dimensional space using a transform, so as to obtain linear divisible data, and then laws of training data are learnt in the new high-dimensional space using a linear classification method. Applying the kernel function to the SVM refers to map an original input space, e.g., an Euclidean space Rn, to a new characteristic space, e.g., a Hilbert space H, and thus a hypersurface in the original space may be transformed to a hyperplane in the Hilbert space.

The kernel function provided in the present disclosure may be a Gaussian kernel function, or the like. Of course, other polynomial kernel functions may be applied to the SVM algorithm to determine the color of the vehicle. Specifically, the processor may determine the confidence coefficient of any color stored in the SVM color identification model based on formula (22):

$$f(x)=\mathrm{sign}(\Sigma_{i-1}^{Q} a^*_i \cdot y_i \cdot K(x,z)+b^*) \qquad (22),$$

wherein Q represents the dimension of the characteristic vector of the vehicle and may be 192, $a^*_i$ represents an optimal Lagrange multiplier vector, $b^*$ represents an optimal hyperplane intercept, and $y_i$ is a preset value ranging from $\{-1, +1\}$.

In the formula (22), $K(x, z)$ is a Gaussian kernel function. The processor may determine $K(x, z)$ according to formula (23):

$$K(x, z) = \exp\left(-\frac{\|x - z\|^2}{2\sigma^2}\right), \qquad (23)$$

In formulas (22) and (23), x represents the characteristic vector of the vehicle, f(x) represents the confidence coefficient corresponding to any color stored in the color identification model, z represents an average value of the characteristic information of the vehicle, and a represents a standard deviation of the characteristic information of the vehicle.

It should be noted that, values of $a^*_i$, $b^*$ and $y_i$ in formulas (22) and (23) may be different for each color stored in the color identification model. For example, the SVM color identification model may be considered as a model including models corresponding to various colors. The processor may input the characteristic vector of the vehicle to the model corresponding to each color in the SVM color identification model. Then the processor may obtain the confidence coefficient corresponding to each color. Thus the processor may determine the color of the vehicle.

In some embodiments, the model corresponding to each color in the SVM color identification model may be pre-trained as well. When not being trained, models in the SVM (e.g., formulas (22) and (23)) may be the same except that the parameter values in the formulas may be unknown. The training process may be a process of determining the parameters in the formulas. The specific training process may be generally as follows.

After the processor finish training the characteristic extraction model, for any color, the processor may obtain a characteristic vector by extracting characteristic information of each of a lot of samples corresponding to the color. The processor may input the characteristic information to a model corresponding to the color in the SVM color identification model. The processor may obtain the parameter values of the model corresponding to the color and then put the parameters to the above formulas. Thus the processor may obtain the model corresponding to the color.

Similarly, the model corresponding to each color can be trained and obtained according to the above method.

The color pre-input to the SVM color identification model provided by the present disclosure may be a single color or a color combination. For example, the color input to the SVM color identification model may include but not limited to: black, white, yellow, red, green, orange, gray, pink-purple, silver-green, silver, brown, or the like. Colors of vehicles sold on the market can all be input into the SVM color identification model provided by the present disclosure. The processor may perform a training based on the colors to obtain SVM models corresponding to the colors. Then, the method provided by the present disclosure may be implemented to determine the color of the vehicle. This may have good generality and may be fast in identifying the color of the vehicle.

In the vehicle color identification process, the processor may obtain the ROI of the vehicle included in the monitoring image. The processor may extract a plurality of sub-regions from the ROI of the vehicle. In order to determine the color of the vehicle accurately, the processor may obtain a cover region and a bumper region from the ROI. The processor may extract the characteristic information of the ROI using the characteristic extraction model corresponding to the ROI. The processor may obtain the second characteristic vector of the ROI. The processor may also extract the characteristic information of the cover region using the characteristic extraction model corresponding to the bumper region and obtain the first characteristic vector of the cover region. The processor may also extract the characteristic information of the bumper region using the characteristic extraction model corresponding to the bumper region and obtain the first characteristic vector of the bumper region. The processor may obtain the second characteristic vector of the ROI. The processor may also extract the characteristic information of the bumper region using the characteristic extraction model corresponding to the bumper region and obtain the first characteristic vector of the bumper region. After obtaining the three characteristic vectors, the processor may fuse the three characteristic vectors to obtain the characteristic vector of the vehicle. The processor may input the characteristic vector of the vehicle to the preset color identification model. The processor may determine the confidence coefficient corresponding to each color stored in the color identification model based on the input characteristic vector of the vehicle. The processor may designate the color whose confidence coefficient is the maximum as the color of the vehicle. Extracting the characteristic information of each region using different characteristic extraction models can not only identify the color of the vehicle rapidly, but also improve the accuracy of the identified vehicle color. Further, since the color stored in the preset color identification model may be a color combination, the method provided by some embodiments of the present disclosure can also relatively accurately identify vehicles with a color combination. The method provided in the present disclosure can be applied to driving assistance and a vehicle intelligent monitoring system. The method provided in the present disclosure can realize fast automatic identification of the vehicle color.

Based on the same inventive concept, some embodiments of the present disclosure further provides a vehicle color identification device. Since the principle of the device to solve the problem may be similar to the vehicle color identification method, the implementation of the device can refer to the implementation of the method. The repetitive parts will not be described.

Figure 11:
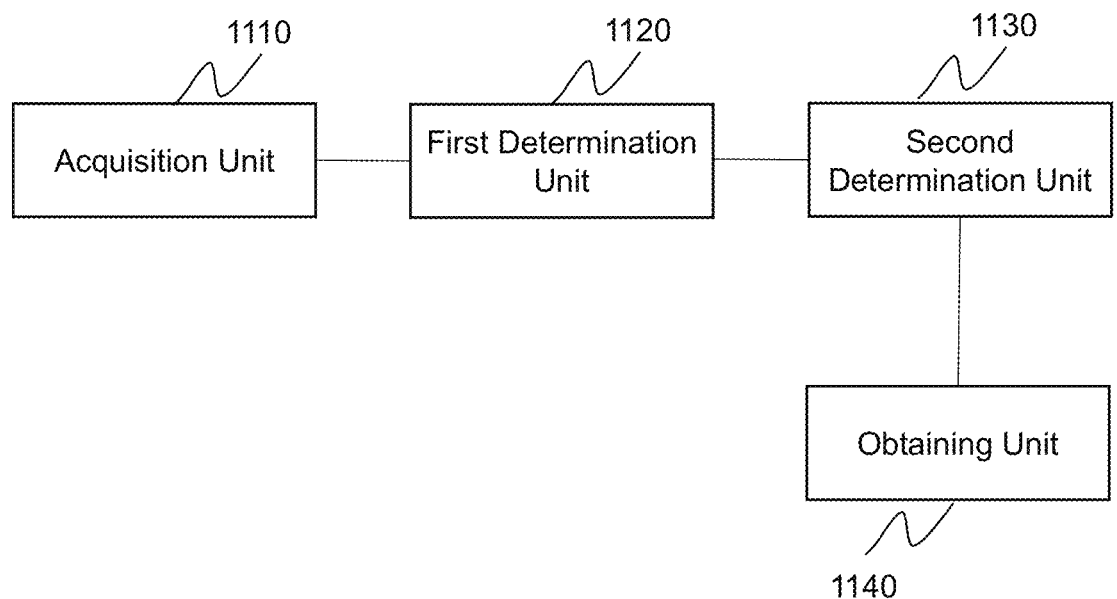
FIG. 11 is a schematic block diagram of an exemplary vehicle color identification device according to some embodiments of the present disclosure.

FIG. 11 is a schematic block diagram of an exemplary vehicle color identification device according to some embodiments of the present disclosure. The vehicle identification device may include: an acquisition unit 1110, a first determination unit 1120, a second determination unit 1130 and an obtaining unit 1140.

The acquisition unit 1110 may be configured to obtain an ROI of a vehicle included in a monitoring image. The ROI may be the entire region of the vehicle included in the monitoring image. As used herein, the monitoring image may be a target image including an object of which the color is to be identified.

The first determination unit 1120 may be configured to determine at least one sub-region of the vehicle from the ROI of the vehicle.

The second determination unit 1130 may be configured to determine characteristic information of each of the sub-regions of the vehicle and extract characteristic information of the ROI.

The obtaining unit 1140 may be configured to obtain a color of the vehicle using a preset color identification model based on the characteristic information of the ROI and the characteristic information of each sub-region of the vehicle.

In some embodiments, the first determination unit 1120 may be configured to, if the ROI includes a cover region and/or a bumper region, extract the cover region and/or the bumper region from the ROI. The cover region may include a front-cover region or a rear-cover region. The bumper region may include a front-bumper region or a rear-bumper region.

In some embodiments, the acquisition unit 1110 may be configured to convert the monitoring image into an RGB format; and obtain an ROI of the vehicle from the RGB-format image.

In some embodiments, the second determination unit 1130 may be configured to, for each of the sub-regions of the vehicle, extract the characteristic information of the sub-region of the vehicle using a characteristic extraction model corresponding to the sub-region of the vehicle. The second determination unit 1130 may be configured to obtain a first characteristic vector of the sub-region of the vehicle. The second determination unit 1130 may be configured to extract the characteristic information of the ROI using the characteristic extraction model corresponding to the ROI. The second determination unit 1130 may be configured to obtain the second characteristic vector of the ROI.

The second determination unit 1130 may be further configured to determine a first pooling matrix of the sub-region of the vehicle by performing a first number of times of convolution operation based on a first pixel matrix and a first number of convolution kernels. The first pixel matrix may include a pixel value of each pixel of the sub-region of the vehicle. The second determination unit 1130 may be further configured to perform a full connection operation on the first pooling matrixes of the sub-region of the vehicle to obtain a first row vector of the sub-region of the vehicle. The first row vectors may have the same dimension. The second determination unit 1130 may be specifically configured to designate the first row vector of the sub-region of the vehicle as a characteristic vector of the sub-region of the vehicle. The second determination unit 1130 may be specifically configured to determine a first pooling matrix of the ROI by performing a second number of times of convolution operation based on a second pixel matrix a second number of convolution kernels. The second pixel matrix may include a pixel value of each pixel of the ROI. The second determination unit 1130 may be further configured to perform full connection process on the pooling matrix of the ROI to obtain a second row vector of the ROI. The second row vector and the first row vectors may have the same dimension. The second determination unit 1130 may be configured to determine the second row vector of the ROI as a characteristic vector of the ROI.

The second determination unit 1130 may be further configured to perform the following process for a $K^{th}$ convolution operation including: performing a downsampling process on a convolution matrix obtained by a $(K-1)^{th}$ convolution operation to obtain a downsampling matrix corresponding to the $K^{th}$ convolution; and performing the $K^{th}$ convolution operation on the downsampling matrix corresponding to the $K^{th}$ convolution using an $K^{th}$ convolution kernel to obtain a convolution matrix of the $K^{th}$ convolution operation. K may be an integer between 2 and the first number or an integer between 2 and the second number. When K is 2, the convolution matrix obtained by a $1^{st}$ convolution operation is obtained by performing a convolution operation on the first pixel matrix of the sub-region of the vehicle or the second pixel matrix of the ROI using a first convolution kernel; when K is equal to the first number, the convolution matrix obtained by the $K^{th}$ convolution operation may be the first pooling matrix of the sub-region of the vehicle; or when K is equal to the second number, the convolution matrix obtained by the $K^{th}$ convolution operation may be the second pooling matrix of the ROI.

In some embodiments, the obtaining unit 1140 may be configured to fuse the second characteristic vector of the ROI and the first characteristic vector of each sub-region of the vehicle to obtain a characteristic vector of the vehicle. The obtaining unit 1140 may be further configured to determine a confidence coefficient of each color stored in the preset color identification model using the preset color identification model, based on the characteristic vector of the vehicle. The obtaining unit 1140 may be further configured to designate a color whose confidence coefficient is the maximum as a color of the vehicle.

In some embodiments, the color stored in the preset color identification model may be a single color or a color combination.

For the convenience of description, each part of the above color identification device is divided into modules (or units) according to functions and described separately. Of course, the functionality of each module (or unit) may be implemented in the same or multiple software or hardware when implementing the present disclosure.

Another embodiment of the present disclosure provides a non-volatile computer storage medium. The non-volatile computer storage medium may store computer-executable instructions. The computer-executable instructions may perform the color identification method in any of the above embodiments.

Figure 12:
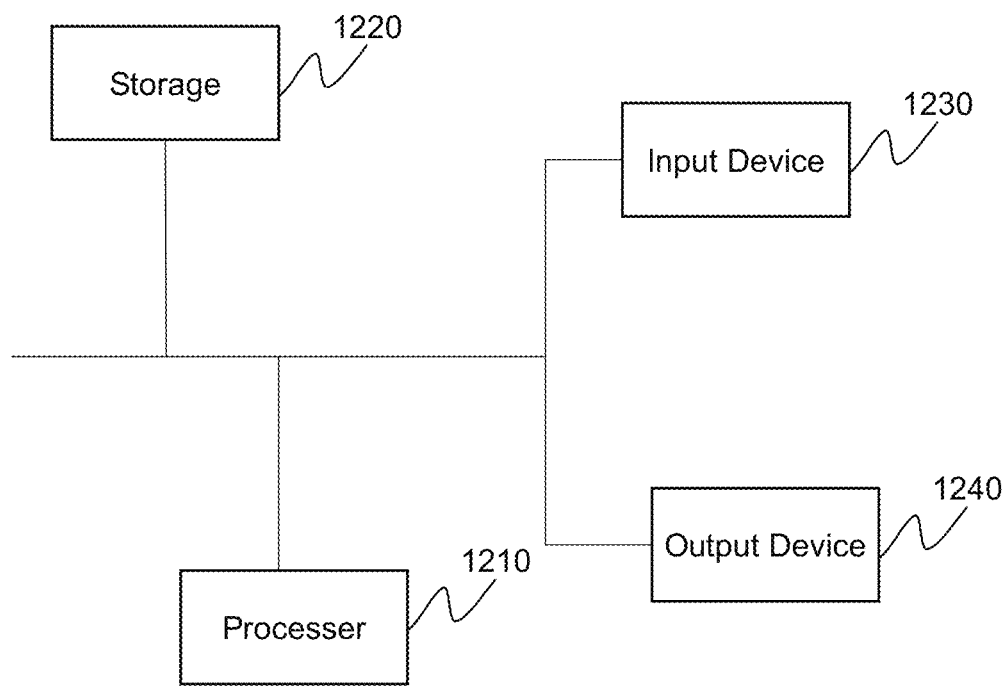
FIG. 12 is a block diagram of an exemplary electronic device for implementing a color identification method according to some embodiment of the present disclosure.

FIG. 12 is a block diagram of an exemplary electronic device for implementing a color identification method according to some embodiment of the present disclosure. As shown in FIG. 12, the electronic device may include: one or more processors 1210 and a storage 1220. FIG. 12 shows one processor 1210 as an example.

The electronic device for performing the vehicle color identification method may further include: an input device 1230 and an output device 1240. The processor 1210, the storage 1220, the input device 1230 and the output device 1240 may be connected via a bus or by other approaches. FIG. 12 shows the connection via a bus as an example.

The storage 1220 may be a non-volatile computer storage medium for storing non-volatile software programs, non-volatile computer executable programs, and modules, such as the program instructions/modules/units corresponding to the color identification method according to some embodiments of the present disclosure (e.g., the acquisition unit 1110, the first determination unit 1120, the second determination unit 1130 and the obtaining unit 1140, as shown in FIG. 11). The processor 1210 may execute various functional applications and data processing of the server or the smart terminal by executing the non-volatile software programs, instructions, and modules/units stored in the storage 1220, i.e., implements the above color identification method.

The storage 1220 may include a program storage area and a data storage area. The program storage area may store an operating system and an application required by at least one function. The data storage area may store data created based on the use of the vehicle color identification device, etc. Further, the storage 1220 may include a high-speed random access memory, and may also include a non-volatile storage, such as at least one disk storage device, a flash memory device, or other non-volatile solid-state storage devices. In some embodiments, the storage 1220 may optionally include storages remotely located with respect to the processor 1210 and these remote storages may be connected to the color identification device via a network. Examples of the network may include, but are not limited to, Internet, intranets, local area networks, mobile communication networks, or the like, or a combination thereof.

The input device 1230 may receive input numeric or character information and generate a key signal input related to user settings and function control of the color identification device. The output device 1240 may include a display device such as a display screen.

The storage 1220 may store one or more modules in the storage 1220. When executed by the one or more processor 1210, the one or more modules perform the color identification method in any of the above method embodiments.

The above products may execute the methods provided in some embodiments of the present disclosure, and have the corresponding functional modules and beneficial effects for performing the method. For technical details that are not described in detail in this embodiment, reference may be made to the methods provided in some embodiments of the present disclosure.

The electronic device provided by some embodiments of the present disclosure is in many forms, including but not limited to:

(1) a mobile communication device: the characteristic of this type of device is to have the function of mobile communication, and to offer the speech, data communication as the main goal. This device may include: smartphones (such as iPhones), multimedia phones, characteristic phones, and low-end phones.

(2) an ultra-mobile personal computer device: this type of device belongs to personal computers and has computing and processing functions, and generally has the characteristics of mobile Internet access. This device may include: a Personal Digital Assistant (PDA), a Mobile Internet Device (MID), and a Ultra-Mobile Personal Computer (UMPC), or the like. For example, the ultra-mobile personal computer device may include an iPad.

(3) a portable entertainment device: This type of device can display and play multimedia contents. This type of device may include: audio and video players (such as an iPod), handheld game consoles, e-books, smart toys and portable car navigation devices.

(4) a server: provides devices for computing services. The server includes a processor, hard disk, memory, a system bus, etc. The server is similar to a general-purpose computer architecture, but requires higher processing power, stability, reliability, security, scalability, manageability, or the like, due to the need to provide highly reliable services.

(5) other electronic devices with data interaction functions.

Another embodiment of the present disclosure provides a computer program product including computer instructions stored in a non-transient computer readable storage medium. The computer program may include program instructions. When the program instructions are executed by a computer, the computer may be caused to execute any one of the color identification methods in the above method embodiments of the present disclosure.

The color identification device provided by some embodiments of the present disclosure may be implemented by a computer program. Those skilled in the art should understand that the above module division method is only one of many module division methods. Being divided into other modules or not divided into modules should all be within the protection scope of the present disclosure, as long as the color identification device has the above functions.

Some embodiments of the present disclosure provide a computer readable storage medium, storing a computer program that can be executed by a computing device. When the computer program is run on the computing device, the computing device is caused to perform the operations of the target image processing method described above.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "some embodiments," and/or "some embodiments" mean that a particular characteristic, structure or characteristic described in connection with some embodiments is included in at least one embodiment of the present disclosure. Therefore, it is emphasized and should be appreciated that two or more references to "some embodiments" or "one embodiment" or "an alternative embodiment" in various portions of this specification are not necessarily all referring to the same embodiment. Furthermore, the particular characteristics, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for performing operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various characteristics are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more characteristics than are expressly recited in each claim. Rather, claimed subject matter may lie in less than all characteristics of a single foregoing disclosed embodiment.

We claim:
1. A system for image processing, comprising:
at least one storage medium storing a set of instructions; and
at least one processor configured to communicate with the at least one storage medium, wherein when executing the set of instructions, the at least one processor is directed to cause the system to:
obtain a target image having RGB channels including a red channel, a green channel, and a blue channel;
estimate a noise value for each of the RGB channels, wherein to estimate the noise value for each of the RGB channels, the at least one processor is further directed to cause the system to:
obtain a width of the target image and a height of the target image; and
for each of the RGB channels:
perform an edge detection process for the target image;
determine a number count of edge pixels of the target image based on a result of the edge detection process;
perform a convolution process on the target image to obtain a processed image; and
estimate the noise value for the each of the RGB channels based on the width of the target image, the height of the target image, the number count of edge pixels of the target image, and the processed image;
obtain a predetermined noise value for each of the RGB channels;
determine, based on the predetermined noise values, a channel correlation coefficient of the RGB channels; and
correct a color of the target image based on the noise values and the channel correlation coefficient of the RGB channels.

2. The system of claim 1, wherein to estimate the noise value for the each of the RGB channels based on the width of the target image, the height of the target image, the number count of edge pixels of the target image, and the processed image, the at least one processor is further directed to cause the system to:
obtain internal pixels of the processed image, the internal pixels including pixels of the processed image excluding edge pixels of the processed image;
determine an absolute value of luminance for each of the internal pixels;
determine a sum value of the absolute values; and
estimate the noise value for the each of the RGB channels based on the width of the target image, the height of the target image, the number count of edge pixels of the target image, and the sum value of the absolute values.

3. The system of claim 1, wherein to determine, based on the predetermined noise values, a channel correlation coefficient of the RGB channels, the at least one processor is further directed to cause the system to:
divide the target image into a plurality of sub-images; and
for each of the plurality of sub-images:
determine an RGB value for each pixel in the sub-image; and
determine the channel correlation coefficient of the RGB channels for the sub-image based on the RGB values of the pixels in the sub-image, and the predetermined noise values.

4. The system of claim 3, wherein to correct the color of the target image based on the noise values and the channel correlation coefficient of the RGB channels, the at least one processor is further directed to cause the system to:
for each of the plurality of sub-images:
obtain a first correction matrix;
determine a modification matrix based on the noise values and the channel correlation coefficient of the RGB channels of the sub-image;
determine a second correction matrix based on the first correction matrix and the modification matrix; and
correct the color of the target image based on the second correction matrixes.

5. The system of claim 4, wherein to determine the modification matrix based on the noise values and the channel correlation coefficient of the RGB channels of the each of the plurality of sub-images, the at least one processor is further directed to cause the system to, for each of the plurality of sub-images:
determine a noise related parameter of the target image based on the noise values of the RGB channels; and
determine the modification matrix based on the noise related parameter of the target image and the channel correlation coefficient of the RGB channels of the sub-image.

6. The system of claim 5, wherein to determine the modification matrix based on the noise related parameter of the target image and the channel correlation coefficient of the RGB channels of the each of the plurality of sub-images, the at least one processor is further directed to cause the system to:
adjust the modification matrix by adjusting the noise related parameter of the target image based on the noise values of the RGB channels, until all values on principal diagonals of the modification matrix are greater than or equal to zero.

7. The system of claim 4, wherein to correct the color of the target image based on the second correction matrixes, the at least one processor is further directed to cause the system to:
for each pixel of the target image:
determine at least one related second correction matrix from the second correction matrixes, wherein the at least one related second correction matrix corresponding to at least one sub-images that the pixel locates in;
determine a weighted second correction matrix based on a position of the pixel and at least one position of the at least one sub-images that the pixel locates in; and
correct a color of the pixel based on the weighted second correction matrix.

8. A method for image processing, comprising:
obtaining a target image having RGB channels including a red channel, a green channel, and a blue channel;
estimating a noise value for each of the RGB channels by:
obtaining a width of the target image and a height of the target image; and
for each of the RGB channels:
performing an edge detection process for the target image;
determining a number count of edge pixels of the target image based on a result of the edge detection process;
performing a convolution process on the target image to obtain a processed image; and
estimating the noise value for the each of the RGB channels based on the width of the target image, the height of the target image, the number count of edge pixels of the target image, and the processed image;

obtaining a predetermined noise value for each of the RGB channels;

determining, based on the predetermined noise values, a channel correlation coefficient of the RGB channels; and correcting a color of the target image based on the noise values and the channel correlation coefficient of the RGB channels.

9. The method of claim 8, wherein the estimating the noise value for the each of the RGB channels based on the width of the target image, the height of the target image, the number count of edge pixels of the target image, and the processed image includes:

obtaining internal pixels of the processed image, the internal pixels including pixels of the processed image excluding edge pixels of the processed image;

determining an absolute value of luminance for each of the internal pixels;

determining a sum value of the absolute values; and estimating the noise value for the each of the RGB channels based on the width of the target image, the height of the target image, the number count of edge pixels of the target image, and the sum value of the absolute values.

10. The method of claim 8, wherein the determining, based on the predetermined noise values, the channel correlation coefficient of the RGB channels includes:

dividing the target image into a plurality of sub-images; and for each of the plurality of sub-images:

determining an RGB value for each pixel in the sub-image; and determining the channel correlation coefficient of the RGB channels for the sub-image based on the RGB values of the pixels in the sub-image, and the predetermined noise values.

11. The method of claim 10, wherein the correcting the color of the target image based on the noise values and the channel correlation coefficient of the RGB channels includes:

for each of the plurality of sub-images:

obtaining a first correction matrix;

determining a modification matrix based on the noise values and the channel correlation coefficient of the RGB channels of the sub-image;

determining a second correction matrix based on the first correction matrix and the modification matrix; and correcting the color of the target image based on the second correction matrixes.

12. The method of claim 11, wherein the determining the modification matrix based on the noise values and the channel correlation coefficient of the RGB channels of the each of the plurality of sub-images includes:

for each of the plurality of sub-images:

determining a noise related parameter of the target image based on the noise values of the RGB channels; and determining the modification matrix based on the noise related parameter of the target image and the channel correlation coefficient of the RGB channels of the sub-image.

13. The method of claim 11, wherein the correcting the color of the target image based on the second correction matrixes includes:

for each pixel of the target image:

determining at least one related second correction matrix from the second correction matrixes, wherein the at least one related second correction matrix corresponding to at least one sub-images that the pixel locates in;

determining a weighted second correction matrix based on a position of the pixel and at least one position of the at least one sub-images that the pixel locates in; and correcting a color of the pixel based on the weighted second correction matrix.

14. A system for identifying a color of an object, comprising:

at least one storage medium storing a set of instructions; and at least one processor configured to communicate with the at least one storage medium, wherein when executing the set of instructions, the at least one processor is directed to cause the system to:

obtain a target image including the object;

identify in the target image a region of interest (ROI) including the object;

identify at least one sub-region of the object from the ROI of the object;

determine at least one first characteristic vector respectively corresponding to the at least one sub-region;

determine a second characteristic vector of the ROI of the object; and identify, based on the at least one first characteristic vector and the second characteristic vector, the color of the object using a color identification model.

15. The system of claim 14, wherein the target image includes RGB channels including a red channel, a green channel, and a blue channel, and the at least one processor is further directed to cause the system to:

estimate a noise value for each of the RGB channels;

obtain a predetermined noise value for each of the RGB channels;

determine, based on the predetermined noise values, a channel correlation coefficient of the RGB channels; and correct a color of the target image based on the noise values and the channel correlation coefficient of the RGB channels.

16. The system of claim 14, wherein to determine the at least one first characteristic vector, the at least one processor is further directed to cause the system to:

for each of the at least one sub-region:

determine, based on a first convolution operation, a first pooling matrix for the sub-region;

determine a first row vector for the sub-region by performing a first full connection operation to the first pooling matrix; and designate the first row vector as the first characteristic vector.

17. The system of claim 16, wherein to identify the color of the object using the color identification model, the at least one processor is further directed to cause the system to:

determine a characteristic vector of the object by combining a plurality of first characteristic vectors and the second characteristic vector;

determine, based on the characteristic vector of the object, a plurality of confidence coefficients corresponding to a plurality of color classifications included in the color identification model;

designate the color of the object based on the plurality of confidence coefficients and the plurality of color classifications.

18. The system of claim 14, wherein to determine a second characteristic vector of the ROI of the object, the at least one processor is further directed to cause the system to:

determine, based on a second convolution operation, a second pooling matrix for the ROI of the object;

determine a second row vector for the ROI of the object by performing a second full connection operation to the second pooling matrix; and designate the second row vector as the second characteristic vector.

* * * * *